United States Patent
Tanaka et al.

(10) Patent No.: US 7,493,215 B2
(45) Date of Patent: Feb. 17, 2009

(54) NAVIGATION SYSTEM AND OUTPUT CONTROLLING METHOD THEREFOR

(75) Inventors: Katsuaki Tanaka, Kawasaki (JP); Yoshibumi Fukuda, Tokyo (JP); Yoshitaka Atarashi, Kawasaki (JP); Tadashi Kamiwaki, Tokai (JP)

(73) Assignee: Xanavi Informatics Corporation, Zama-shi (JP)

( * ) Notice: Subject to any disclaimer, the term of this patent is extended or adjusted under 35 U.S.C. 154(b) by 197 days.

(21) Appl. No.: 11/657,487

(22) Filed: Jan. 25, 2007

(65) Prior Publication Data
US 2007/0233378 A1 Oct. 4, 2007

(30) Foreign Application Priority Data
Mar. 30, 2006 (JP) ............................. 2006-095639

(51) Int. Cl.
*G06F 7/00* (2006.01)

(52) U.S. Cl. ........................... 701/211; 701/36; 701/45; 340/995.1; 340/995.14; 340/995.26

(58) Field of Classification Search .................. 701/36, 701/45, 211; 340/995.1, 995.14, 995.26
See application file for complete search history.

(56) References Cited

U.S. PATENT DOCUMENTS

| | | | |
|---|---|---|---|
| 6,351,705 B1 * | 2/2002 | Yoshioka | 701/200 |
| 7,062,365 B1 * | 6/2006 | Fei | 701/36 |
| 7,302,322 B1 * | 11/2007 | Szczerba et al. | 701/29 |
| 2004/0160342 A1 * | 8/2004 | Curley et al. | 340/995.1 |
| 2006/0212197 A1 * | 9/2006 | Butler et al. | 701/36 |
| 2007/0129864 A1 * | 6/2007 | Tanaka et al. | 701/36 |

FOREIGN PATENT DOCUMENTS

JP 2003-230074 A 8/2003

* cited by examiner

*Primary Examiner*—Khoi Tran
*Assistant Examiner*—Brian J Broadhead
(74) *Attorney, Agent, or Firm*—Crowell & Moring LLP

(57) ABSTRACT

A technology for preventing a driver from being distracted even if a navigation operates on an input device in the rear seat. A navigation system, connected to a combination of an output/input devices of a driver and to a combination of an output device and an input device of a fellow passenger, comprises a setting information storage unit storing setting information indicating whether or not information generated is to be output to the output device of the driver and an output processing unit, to the output device of the driver according to the setting information read from the setting information storage unit. When operation information enters from the input device of the fellow passenger, the setting information, stored in the setting information storage unit for the processing, changes to the information indicating that information is not output to the output device of the driver.

5 Claims, 11 Drawing Sheets

| | 401 | 402 | 403 | 404 | 405 | |
|---|---|---|---|---|---|---|
| | FRAME BUFFER | NAME | DISPLAY SEQUENCE | EXCLUSIVE CONTROL FLAG | OPERATION SEAT | ... |
| | FRAME BUFFER A | MENU | | ○ | FRONT SEAT | ... |
| | FRAME BUFFER B | CONTENT | | ○ | REAR SEAT | ... |
| | FRAME BUFFER C | DISPLAY TARGET ON MAP | | × | — | ... |
| | FRAME BUFFER D | MAP 1 | | × | — | ... |
| | FRAME BUFFER E | MAP 2 | | × | — | ... |

| FRAME BUFFER | SETTING | ... |
|---|---|---|
| FRAME BUFFER A | ON | ... |
| FRAME BUFFER B | OFF | ... |
| FRAME BUFFER C | ON | ... |
| FRAME BUFFER D | ON | ... |
| FRAME BUFFER E | OFF | ... |

| FRAME BUFFER | SETTING | ... |
|---|---|---|
| FRAME BUFFER A | OFF | ... |
| FRAME BUFFER B | ON | ... |
| FRAME BUFFER C | OFF | ... |
| FRAME BUFFER D | OFF | ... |
| FRAME BUFFER E | OFF | ... |

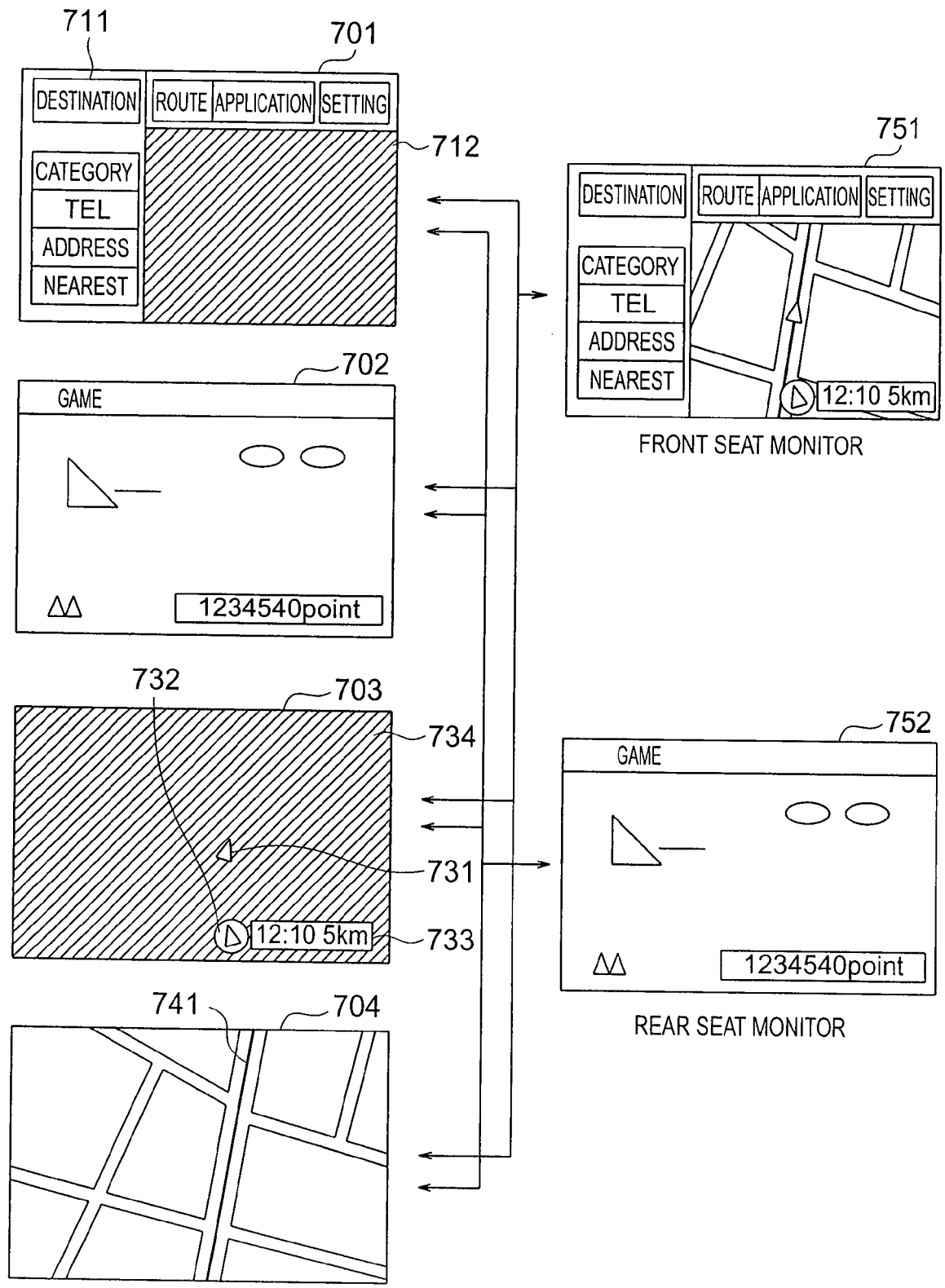

901

FRONT SEAT MONITOR

FRAME BUFFER C
+
FRAME BUFFER D

902

REAR SEAT MONITOR

FRAME BUFFER C
+
FRAME BUFFER D

FRAME BUFFER C
+
FRAME BUFFER D

FRAME BUFFER A + FRAME BUFFER C
+
FRAME BUFFER D

FRAME BUFFER C
+
FRAME BUFFER D

FRAME BUFFER A + FRAME BUFFER C
+
FRAME BUFFER E

FRAME BUFFER C
+
FRAME BUFFER D

FRAME BUFFER A + FRAME BUFFER C
+
FRAME BUFFER E

FRONT SEAT MONITOR 1101

FRAME BUFFER C
+
FRAME BUFFER D

REAR SEAT MONITOR 1102

FRAME BUFFER C
+
FRAME BUFFER D

NAVIGATION SYSTEM AND OUTPUT CONTROLLING METHOD THEREFOR

BACKGROUND OF THE INVENTION

1. Field of the Invention

The present invention relates to a navigation system.

2. Description of the Related Art

In a navigation system, an output device such as a display and a speaker and an input device such as buttons, a remote control, and a remote control receiver are sometimes provided in both the front seat and the rear seat of a car. The output device and the input device in the front seat are used by a driver and a fellow passenger in the front passenger seat to view and operate the car navigation system, and the output device and the input device in the rear seat are used by a fellow passenger in the rear seat to view and operate the navigation system.

A technology for outputting different images on those two output devices is disclosed in JP-A-2003-230074.

SUMMARY OF THE INVENTION

According to the technology disclosed in JP-A-2003-230074, when a fellow passenger in the rear seat uses the input device in the rear seat to operate the navigation system, the screen generated by the operation is output on the output device, such as a display, in the front seat. Therefore, the driver who is driving the car is sometimes distracted by the output device.

In view of the foregoing, it is an object of the present invention to provide a technology for preventing a driver from being distracted even if a navigation operation is performed on the input device in the rear seat.

To achieve the object described above, the present invention provides a navigation system, connected to a combination of a first output device and a first input device and to a combination of a second output device and a second input device, for performing processing indicated by operation information from the input devices and for outputting information, generated by the processing, onto the output devices wherein, when the operation information is entered from the second input device, the information generated by the processing corresponding to the operation is output only on the second output device.

The present invention provides a navigation system, connected to a combination of a first output device and a first input device and to a combination of a second output device and a second input device, for performing processing indicated by operation information from the input devices and for outputting information, generated by the processing, onto the output devices, the navigation system comprising first setting information storage means that stores setting information indicating whether or not the information generated by the processing is to be output to the first output device; second setting information storage means that stores setting information indicating whether or not the information generated by the processing is to be output to the second output device; first output processing means that outputs the information, generated by the processing, to the first output device according to the setting information read from the first setting information storage means; second output processing means that outputs the information, generated by the processing, to the second output device according to the setting information read from the second setting information storage means, and setting means, wherein, when the operation information is entered from the second input device, the setting means changes the setting information, stored in the first setting information storage means, to a setting that does not output the information generated by the processing indicated by the entered operation information.

Other objects, features and advantages of the invention will become apparent from the following description of the embodiments of the invention taken in conjunction with the accompanying drawings.

BRIEF DESCRIPTION OF THE DRAWINGS

FIG. 4 is a diagram showing an example of a frame buffer management table in the embodiment.

FIG. 7 is a diagram showing frame buffers and monitor setting tables in the embodiment.

DESCRIPTION OF THE EMBODIMENTS

One embodiment of the present invention will be described below in detail with reference to the drawings.

Figure 1:
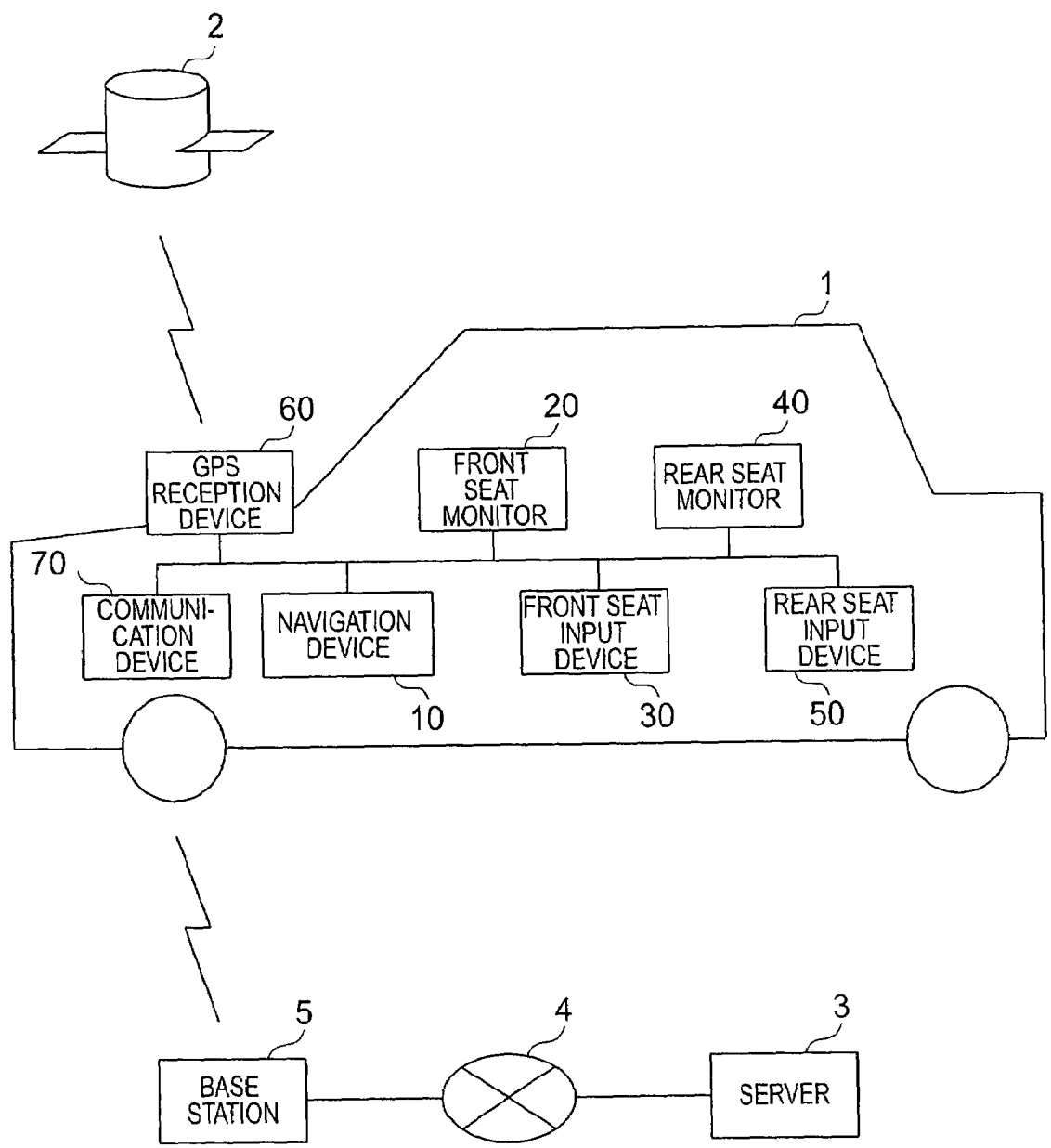
FIG. 1 is a diagram showing an example of the configuration of a system in one embodiment of the present invention.

First, the following describes an example of the system configuration of this embodiment with reference to FIG. 1.

Referring to FIG. 1, a system in this embodiment comprises a car 1, a GPS (Global Positioning System) satellite 2, a server 3, a communication network 4, and a base station 5.

A navigation device 10 is mounted on the car 1. A front seat monitor 20, a front seat input device 30, a rear seat monitor 40, a rear seat input device 50, a GPS reception device 60, and a communication device 70 are connected to the navigation device 10.

The front seat monitor 20, a monitor used by a driver or a fellow passenger in the front passenger seat, is built in the cockpit module in front of the front seat or is installed near the dashboard. The front seat input device 30, an input device used by a driver or a fellow passenger in the front passenger seat to operate the navigation device 10, includes buttons, a touch panel implemented by the front seat monitor 20, a remote control, and a remote control reception unit near the front seat monitor 20. The rear seat monitor 40, a monitor used by a fellow passenger in the rear seat, is installed on the ceiling between the front seat and the rear seat or on the back of the front seat. The rear seat input device 50, an input device used by a fellow passenger in the rear seat to operate the navigation device 10, includes buttons, a touch panel implemented by the rear seat monitor 40, a remote control, and a remote control reception unit near the rear seat monitor 40.

Figure 2:
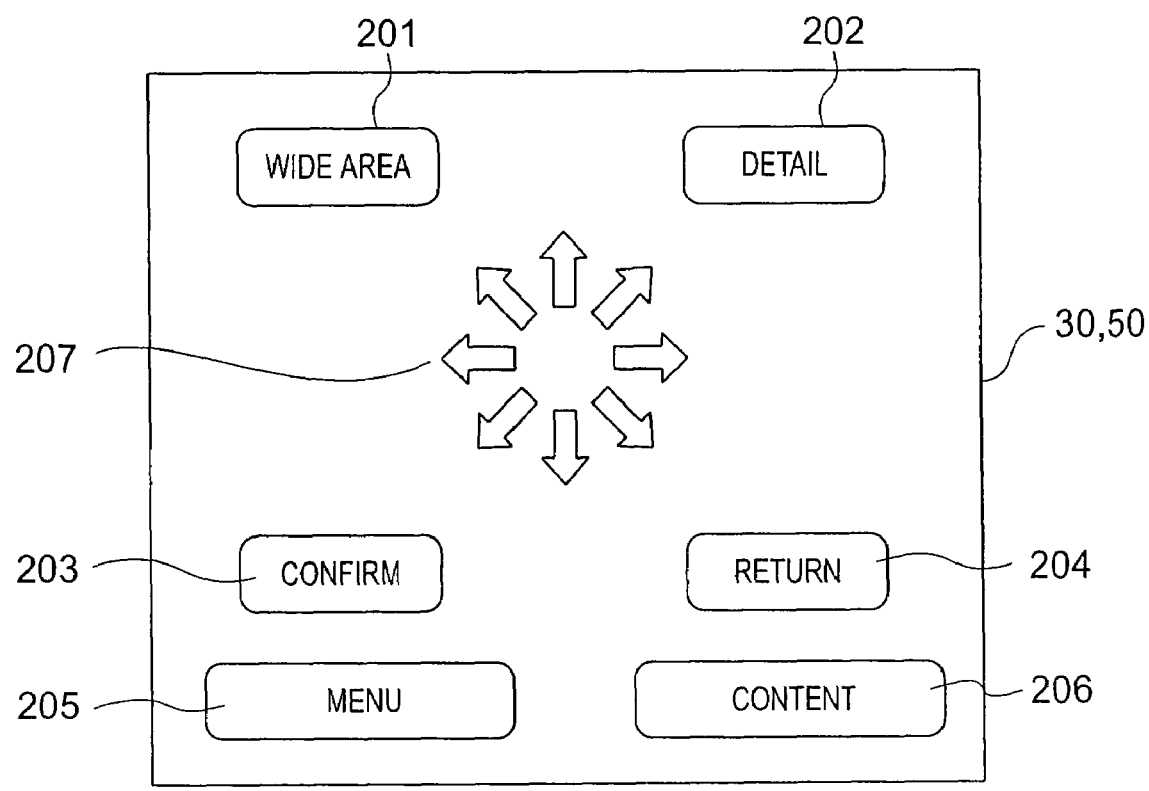
FIG. 2 is a diagram showing an example of an input device in the embodiment.

FIG. 2 shows an example of the front seat input device 30 and the rear seat input device 50. Referring to FIG. 2, the front seat input device 30 and the rear seat input device 50 each have buttons 201-207. The buttons 201 and 202 are buttons used to instruct the scaling of the map displayed on the front seat monitor 20 and the rear seat monitor 40. The button 203 is a button used to instruct the execution of a specified operation. The button 204 is a button used to instruct the cancellation of a specified operation. The button 205 is a button used to instruct the display of a menu of functions available in a conventional navigation system such as route search, recommended route guidance, location search by address and phone number, and landmark search. The button 206 is a button used to instruct the server 3 to send a program and contents such as a moving image and a still image, to execute a program, to play a moving image, and to display a still image. The button 207 is a direction key used to scroll the map and to select an icon displayed on the front seat monitor 20 and the rear seat monitor 40.

Referring to FIG. 1, the navigation device 10 receives signals from the GPS satellite 2 via the GPS reception device 60 to locate the car. The communication device 70 is a device, such as a mobile phone, a PHS (Personal Handyphone System), a Bluetooth (registered trademark) device, or an ETC (Electronic Toll Collection) system, that is connected to the communication network 4 via the base station 5.

The server 3 is a server installed by a company that provides services. For example, in response to a request from the navigation device 10, the server 3 sends a content that is read from the storage device (not shown in the figure) of the server 3. The content that is sent includes, though not limited to, a Java (registered trademark) program, a moving image, and a still image. The function of the server 3 is similar to the conventionally available function and so the detailed description is omitted here.

The communication network 4 is, for example, the Internet, a public network, and a leased line. The navigation device 10 uses the communication device 70 to connect to the communication network 4 via the base station 5 and receives the content sent from the server 3.

The numbers of cars 1, GPS satellites 2, servers 3, communication networks 4, and base stations 5 are not limited to those shown in FIG. 1, but any number of them may be included.

Figure 3:
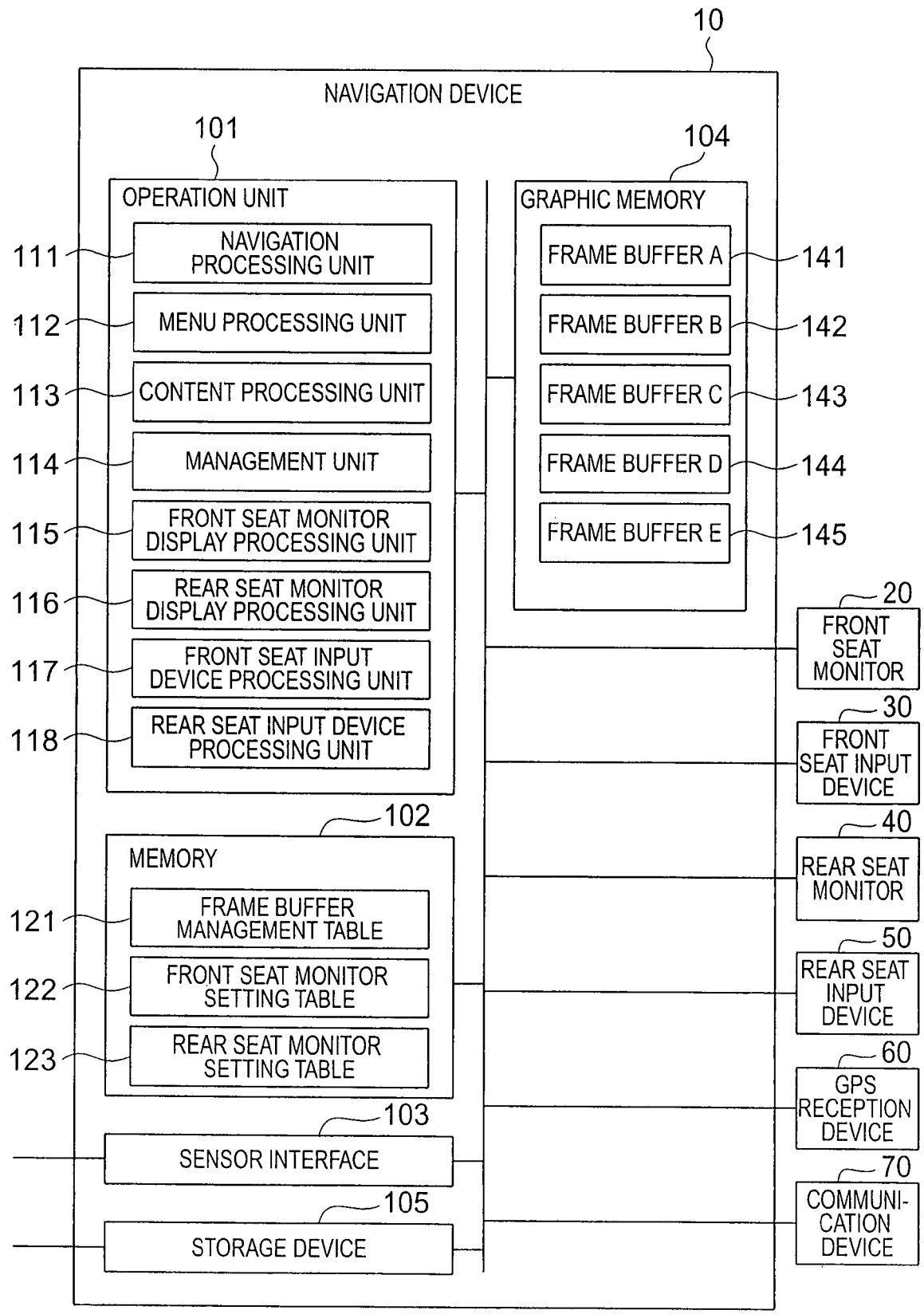
FIG. 3 is a diagram showing an example of the configuration of a navigation device in the embodiment.

Next, the following describes an example of the configuration of the navigation device 10 with reference to FIG. 3.

Referring to FIG. 3, the navigation device 10 comprises an operation unit 101, a memory 102, a sensor interface 103, a graphic memory 104, and a storage device 105. The operation unit 101, memory 102, sensor interface 103, graphic memory 104, and storage device 105 are interconnected via a bus. As described above, the front seat monitor 20, front seat input device 30, rear seat monitor 40, rear seat input device 50, GPS reception device 60, and communication device 70 are connected to the navigation device 10.

The operation unit 101 is, for example, an MPU (Micro Processing Unit).

The memory 102 stores a frame buffer management table 121, a front seat monitor setting table 122, and a rear seat monitor setting table 123. The frame buffer management table 121 stores a correspondence between multiple frame buffers, which will be described later, and information indicating the input devices from which operation information, which is the basis of image data displayed in those frame buffers, was entered. The front seat monitor setting table 122 indicates which of the multiple frame buffers, which will be described later, are displayed on the front seat monitor 20. The rear seat monitor setting table 123 indicates which of the multiple frame buffers, which will be described later, are displayed on the rear seat monitor 40.

The sensor interface 103 is connected to an angular speed sensor, a direction sensor, and a car speed sensor which are not shown.

The graphic memory 104 has multiple frame buffers. Although the graphic memory 104 may have any number of frame buffers, it is assumed in this embodiment that the graphic memory 104 has five frame buffers. In the description below, a symbol is added to a frame buffer, for example, "frame buffer A", to distinguish among the frame buffers.

A frame buffer A 141 is provided to draw a menu that is an interface for accepting a user operation. A frame buffer B 142 is provided to draw a content sent from the server 3. A frame buffer C 143 is provided to draw the current location and direction of the car 1 obtained by the navigation device 10 using the conventionally available navigation system function. A frame buffer D 144 and a frame buffer E 145 are provided to draw a map. In this embodiment, there are two buffers for drawing a map. The two buffers are provided for use in an operation example, which will be described later, to allow different maps to be drawn on the front seat monitor 20 and the rear seat monitor 40, one for each, when different maps are displayed on the front seat monitor 20 and the rear seat monitor 40. In the description below, when the same map is drawn on the front seat monitor 20 and the rear seat monitor 40, the map is drawn in the frame buffer D 144 and, when different maps are drawn on the front seat monitor 20 and the rear seat monitor 40, the different map is drawn in the frame buffer E 145.

The storage device 105 is a storage medium, such as an HDD (Hard Disk Drive), a CD (Compact Disc), and a DVD (Digital Versatile Disk), and a storage medium drive. The storage device 105 stores map data, a phone number list, an address list, and a landmark list. The map data includes traffic information and toll road traffic information. The phone number list is a list containing the correspondence between phone numbers and the locations corresponding to the phone numbers on the map. The address list is a list containing the correspondence between addresses and the locations of the addresses on the map. A landmark list is a list containing the correspondence among the names of famous facilities, the detailed information on the facilities such as the opening time information and the call center, and locations of the facilities on the map. The information stored in the storage device 105 is the same information as that available in the conventional navigation system.

The operation unit 101 executes the programs, not shown, in the memory 102 to implement a navigation processing unit 111, a menu processing unit 112, a content processing unit 113, a management unit 114, a front seat monitor display processing unit 115, a rear seat monitor display processing unit 116, a front seat input device processing unit 117, and a rear seat input device processing unit 118.

The navigation processing unit 111 implements the function available in the conventional navigation system and, in addition, draws images, generated by the navigation function, in the frame buffers in the graphic memory 104. The functions available in the conventional navigation system include the current location calculation function, route search function, guidance function, address/phone number search function, and landmark search function. The current location calculation function calculates the current location of the car 1 based on the sensor output value received via the sensor interface 103 and on the signal received by the GPS reception device 60. The route search function searches for a recommended route to the destination via the pass-through points using, for example, on Dijkstra method based on the current location of the car 1 and the received information on the pass-through points and destination. The guidance function guides the driver to the destination via the received pass-through points by outputting the turn-right/turn-left information and so on according to the recommended route that is searched for and set by the route search function. The address/phone number search function searches for the location corresponding to a received address and/or phone number and outputs the search result. The landmark search function searches for the location of, and the detailed information on, a facility corresponding to a received name, location, and condition and outputs the search result. The navigation processing unit 111 reads image data on a map including the current location, calculated by the current location calculation function, from the storage device 105, draws a map in the frame buffer D 144 and the frame buffer E 145 using the image data that was read and, in addition, draws a recommended route searched for by the route search function and an image indicating right-turn/left-turn instructions generated by the route guidance function in the frame buffer D 144 and the frame buffer E 145. The navigation processing unit 111 also draws the car location, direction marks indicating north, south, east and west, and so on, which will be required for drawing on the map in the frame buffer D 144 and the frame buffer E 145, in the frame buffer C 143.

The menu processing unit 112 reads a menu image from the memory 102 or the storage device 105, in response to operation information entered from the front seat input device 30 and the rear seat input device 50, for displaying a menu, which is a fellow passenger interface used by a fellow passenger to search for the destination, and draws the menu image in the frame buffer A 141.

The content processing unit 113 receives a content from the server 3 via the communication device 70 and draws an image, generated by the execution or reproduction of the received content, in the frame buffer B 142. For example, when the received content is a program, the content processing unit 113 draws an image, displayed as a result of the execution of the program, in the frame buffer B 142. When the received content is a still image or a moving image, the content processing unit 113 draws the image of the still image or the moving image in the frame buffer B 142.

The management unit 114 updates the information in the frame buffer management table 121, front seat monitor setting table 122, and rear seat monitor setting table 123 in response to the operation information passed from the front seat input device processing unit 117 and rear seat input device processing unit 118.

The front seat monitor display processing unit 115 controls the display on the front seat monitor 20 by superimposing multiple frame buffers in the graphic memory 104. In this case, if the front seat monitor setting table 122 contains a frame buffer having an indication that the frame buffer should not be displayed on the front seat monitor 20, the front seat monitor display processing unit 115 controls the display so that the frame buffer will not be displayed.

The rear seat monitor display processing unit 116 controls the display on the rear seat monitor 40 by superimposing multiple frame buffers in the graphic memory 104. In this case, if the rear seat monitor setting table 123 contains a frame buffer having an indication that the frame buffer should not be displayed on the rear seat monitor 40, the rear seat monitor display processing unit 116 controls the display so that the frame buffer will not be displayed.

The front seat input device processing unit 117 passes the operation information, entered from the front seat input device 30, to the management unit 114. The rear seat input device processing unit 118 passes the operation information, entered from the rear seat input device 50, to the management unit 114.

Next, the following describes an example of the tables described above.

First, the following describes an example of the frame buffer management table 121 with reference to FIG. 4.

Referring to FIG. 4, the frame buffer management table 121 comprises the columns Frame buffer 401, Name 402, Display sequence 403, Exclusive control flag 404, Operation seat 405, and so on. The Frame buffer 401, Name 402, Display sequence 403, Exclusive control flag 404, Operation seat 405, and so on are associated with each other. The Frame buffer 401 indicates one of the multiple frame buffers in the graphic memory 104. The Name 402 indicates the name of the operation information or the image type that is drawn in the corresponding Frame buffer 401. The Display sequence 403 indicates the sequence of superimposition of the corresponding Frame buffer 401. The Exclusive control flag 404 is a flag indicating whether the image of the corresponding Frame buffer 401 is to be displayed only in the front seat or the rear seat during the operation of the front seat input device 30 and the rear seat input device 50. In the example in FIG. 4, the Exclusive control flag 404 "O" indicates that the image is to be displayed only in one of the front seat and the rear seat, and the Exclusive control flag 404 "X " indicates that the image is to be displayed in both the front seat and the rear seat at the same time. The Operation seat 405 indicates by which seat, front seat or rear seat, the operation is performed. In the example in FIG. 4, the Operation seat 405 "Front seat" indicates that the operation is performed by the front seat input device 30. The Operation seat 405 "Rear seat" indicates that the operation is performed by the rear seat input device 50. The Operation seat 405 "-" indicates that the operation is performed neither by the front seat input device 30 nor by the rear seat input device 50.

In FIG. 4, the Name 402 "Menu" and "Content" are images drawn by the navigation processing unit 111 and the menu processing unit 112 described above in the frame buffer A 141 and the frame buffer B 142. In the frame buffer management table 121 whose example is shown in FIG. 4, the Exclusive control flag 404 corresponding to each of the Names 402 "Menu" and "Content" is "O". That is, there is a possibility that the screens of the Name 402 "Menu" and "Content" are changed to some other screens by the operation information entered from the rear seat input device 50 and that the changed screens, if displayed directly on the front seat, attract the driver's attention. Therefore, the images of the Name 402 "Menu" and "Content" are controlled so that they are displayed on, or operated by, only one of the front seat and the rear seat.

Note that the information is stored in advance in the Frame buffer 401, Name 402, Display sequence 403, and Exclusive control flag 404 in the frame buffer management table 121. The symbol "-" indicating that no operation is being performed is stored initially as the information in the Operation seat 405 and so on in the frame buffer management table 121. When operation information is entered from the front seat input device 30 and the rear seat input device 50, "Front seat", "Rear seat", and so on are stored by the operation that will be described later.

Figures 5A, 5B:
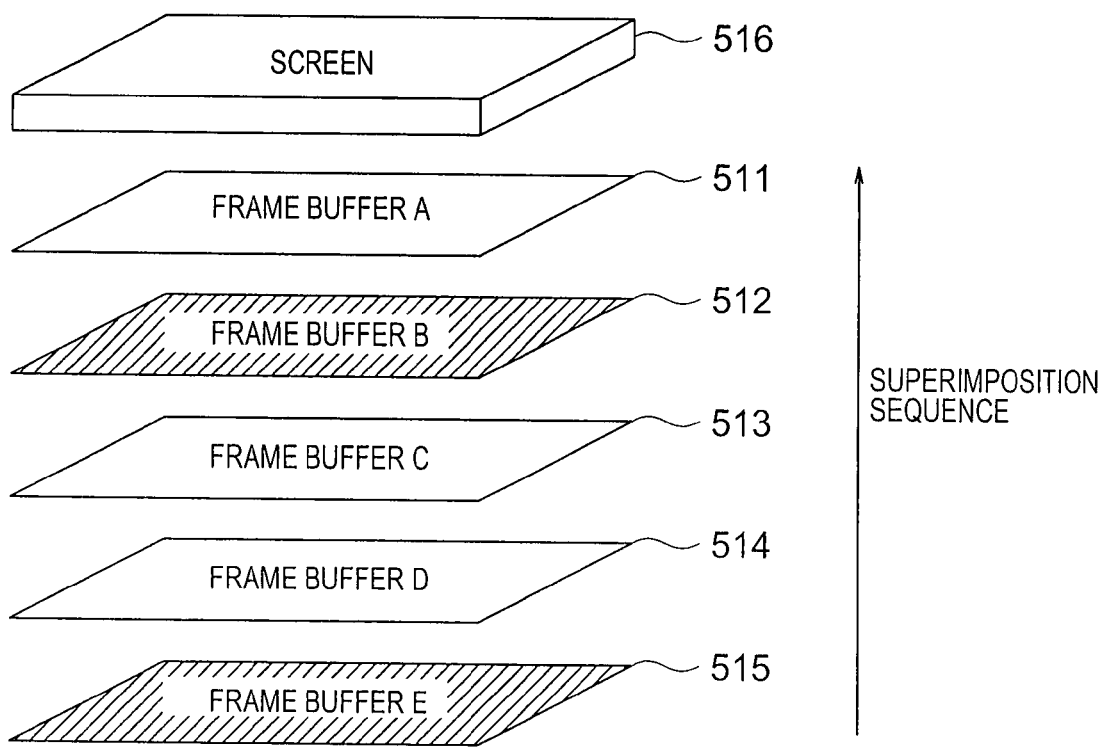
FIGS. 5A and 5B are diagrams showing an example of a front seat monitor setting table in the embodiment.

Next, the following describes an example of the front seat monitor setting table 122 with reference to FIGS. 5A and 5B.

Referring to FIG. 5A, the front seat monitor setting table 122 comprises columns such as Frame buffer 501 and Setting 502. The Frame buffer 501 and the Setting 502 are associated with each other. The Frame buffer 501 indicates one of the multiple frame buffers in the graphic memory 104. The Setting 502 indicates whether the corresponding Frame buffer 501 is to be displayed. In FIG. 5A, the Setting 502 "ON" indicates that the corresponding Frame buffer 501 is to be displayed. The Setting 502 "OFF" indicates that the corresponding Frame buffer 501 is not to be displayed.

FIG. 5B is a diagram showing how the frame buffers in the graphic memory 104 are displayed when the front seat monitor setting table 122 is set as shown in the example in FIG. 5A. In FIG. 5B, a frame buffer 511 corresponds to the frame buffer A 141. A frame buffer 512 corresponds to frame buffer B 142. A frame buffer 513 corresponds to the frame buffer C 143. A frame buffer 514 corresponds to the frame buffer D 144. A frame buffer 515 corresponds to the frame buffer E 145. A screen 516 is a screen generated, and displayed on the front seat monitor 20, by the front seat monitor display processing unit 115 by superimposing the frame buffer 511, frame buffer 512, frame buffer 513, frame buffer 514, and frame buffer 515. The front seat monitor display processing unit 115 may reference the front seat monitor setting table 122 any time, for example, at an interval of a predetermined time or when the front seat monitor setting table 122 is updated.

The front seat monitor display processing unit 115 superimposes the frames in the sequence indicated by the Display sequence 403 of the frame buffer management table 121. That is, the example of the frame buffer management table 121 shown in FIG. 4 contains "1" in the Display sequence 403 corresponding to the Frame buffer 401 "Frame buffer A" and, therefore, the front seat monitor display processing unit 115 superimposes the frame buffer 511 in FIG. 5B so that it is displayed in the front. The example of the frame buffer management table 121 shown in FIG. 4 contains "2" in the Display sequence 403 corresponding to the Frame buffer 401 "Frame buffer B" and, therefore, the front seat monitor display processing unit 115 superimposes the frame buffer 512 in FIG. 5B so that it is displayed as the second frame buffer from the front. The example of the frame buffer management table 121 shown in FIG. 4 contains "3" in the Display sequence 403 corresponding to the Frame buffer 401 "Frame buffer C" and, therefore, the front seat monitor display processing unit 115 superimposes the frame buffer 513 in FIG. 5B so that it is displayed as the third buffer frame from the front. The example of the frame buffer management table 121 shown in FIG. 4 contains "4" in the Display sequence 403 corresponding to the Frame buffer 401 "Frame buffer D" and, therefore, the front seat monitor display processing unit 115 superimposes the frame buffer 514 in FIG. 5B so that it is displayed as the fourth frame buffer from the front. The example of the frame buffer management table 121 shown in FIG. 4 contains "5" in the Display sequence 403 corresponding to the Frame buffer 401 "Frame buffer E" and, therefore, the front seat monitor display processing unit 115 superimposes the frame buffer 512 in FIG. 5B so that it is displayed as the fifth frame buffer from the front, that is, as the back frame buffer.

In the front seat monitor setting table 122 whose example is shown in FIG. 5A, the Setting 502 corresponding to the Frame buffer 501 "Frame buffer B" and "Frame buffer E" is "OFF". Therefore, with the frame buffer 512 and the frame buffer 515 in FIG. 5B placed in the non-display mode, the front seat monitor display processing unit 115 does not display the images, drawn in the frame buffer B 142 and the frame buffer E 145, on the front seat monitor 20, but displays the images, drawn in the other frame buffers, on the front seat monitor 20.

Note that the Setting 502 corresponding to the Frame buffer 501 "Frame buffer A", "Frame buffer B", and "Frame buffer E" of the front seat monitor setting table 122 initially contains "OFF", and the Setting 502 corresponding to the other frame buffers 501 initially contains "ON". The Setting 502 is rewritten, as needed, by the operation examples that will be described later.

Figures 6A, 6B:
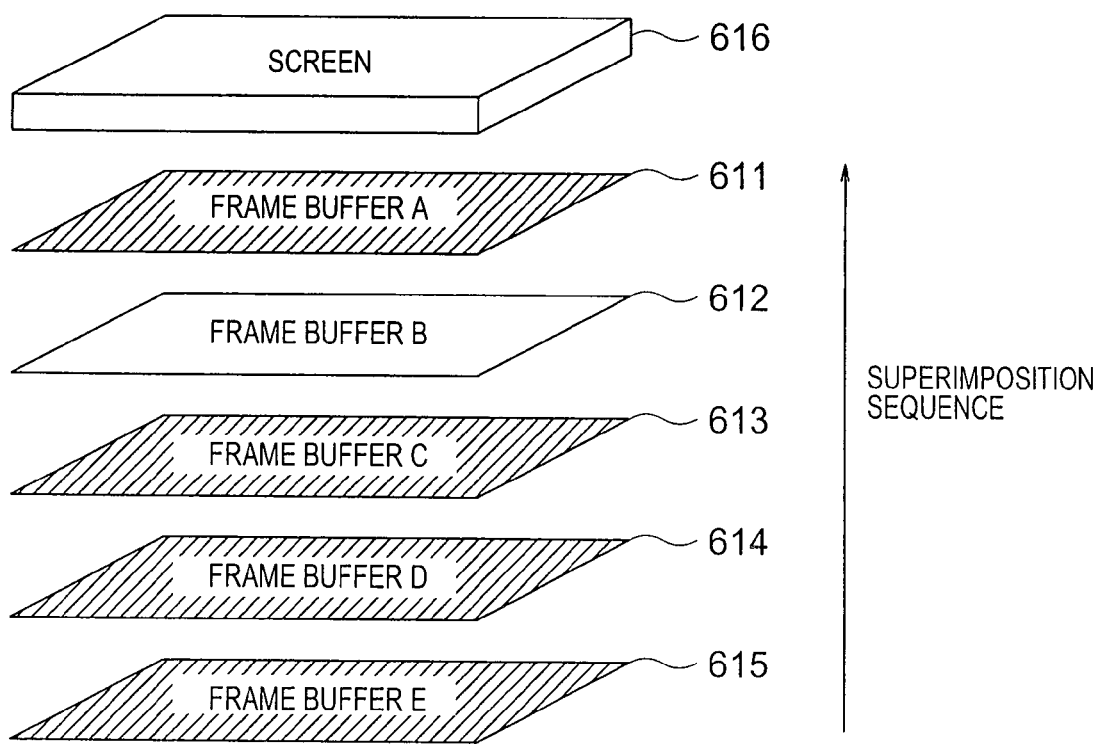
FIGS. 6A and 6B are diagrams showing an example of a rear seat monitor setting table in the embodiment.

Next, the following describes an example of the rear seat monitor setting table 123 with reference to FIGS. 6A and 6B.

The example of the rear seat monitor setting table 123 shown in FIG. 6A comprises columns such as a Frame buffer 601, a Setting 602, and so on. The Frame buffer 601, Setting 602, and so on are associated with each other. The Frame buffer 601 indicates one of the multiple frame buffers in the graphic memory 104. The Setting 602 indicates whether or not the corresponding Frame buffer 601 is to be displayed. In FIG. 6A, the Setting 602 "ON" indicates that the corresponding Frame buffer 601 is to be displayed. The Setting 602 "OFF" indicates that the corresponding Frame buffer 601 is not to be displayed.

FIG. 6B is a diagram showing how the frame buffers in the graphic memory 104 are displayed when the rear seat monitor setting table 123 is the one shown in the example in FIG. 6A. In FIG. 6B, a frame buffer 611 corresponds to the frame buffer A 141. A frame buffer 612 corresponds to the frame buffer B 142. A frame buffer 613 corresponds to the frame buffer C 143. A frame buffer 614 corresponds to the frame buffer D 144. A frame buffer 615 corresponds to the frame buffer E 145. A screen 616 is a screen generated, and displayed on the rear seat monitor 40, by the rear seat monitor display processing unit 116 by superimposing the frame buffer 611, frame buffer 612, frame buffer 613, frame buffer 614, and frame buffer 615. The rear seat monitor display processing unit 116 may reference the rear seat monitor setting table 123 any time, for example, at an interval of a predetermined time, or when the rear seat monitor setting table 123 is updated.

The sequence in which the front seat monitor display processing unit 115 superimposes the frame buffers is the same as that of the front seat monitor 20 described with reference to FIGS. 5A and 5B and, therefore, the description is omitted.

In the rear seat monitor setting table 123 whose example is shown in FIG. 6A, the Setting 602 corresponding to the Frame buffer 601 "Frame buffer A", "Frame buffer C", "Frame buffer D", and "Frame buffer E" is "OFF". Therefore, with the frame buffer 611, frame buffer 613, frame buffer 614, and frame buffer 615 in FIG. 6B placed in the non-display mode, the rear seat monitor display processing unit 116 does not display the images, drawn in the frame buffer A 141, frame buffer C 143, frame buffer D 144, and frame buffer E 145, on the rear seat monitor 40 but displays the images, drawn in the other frame buffer, on the screen 616 of the rear seat monitor 40.

Note that the Setting 602 corresponding to the Frame buffer 601 "Frame buffer A", "Frame buffer B", and "Frame buffer E" of the rear seat monitor setting table 123 initially contains "OFF", and the Setting 602 corresponding to the other Frame buffers 601 initially contains "ON". The Setting 602 is rewritten, as needed, by the operation examples that will be described later.

The following describes an example of screens displayed on the front seat monitor 20 and the rear seat monitor 40 with reference to FIG. 7 when the example of the front seat monitor setting table 122 shown in FIG. 5A and the example of rear seat monitor setting table 123 shown in FIG. 6A are used.

In FIG. 7, a frame buffer 701 corresponds to the frame buffer A 141. A frame buffer 702 corresponds to the frame buffer B 142. A frame buffer 703 corresponds to the frame buffer C 143. A frame buffer 704 corresponds to the frame buffer D 144. Because the Setting both in the front seat monitor setting table 122 whose example is shown in FIG. 5A and in the rear seat monitor setting table 123 whose example is shown in FIG. 6A contains "OFF" for "frame buffer E", the frame buffer E 145 is omitted in the example shown in FIG. 7.

A menu, such as a menu 711 shown in the example, is drawn in the frame buffer 701 by the menu processing unit 112. A shaded part 712 indicates an area of a transparent color. The frame buffer 702 shows an example of a frame buffer when the content processed by the content processing unit 113 is a game. The content processing unit 113 executes a program, sent from the server 3, to draw a game screen such as the one shown in the example in the frame buffer 702. The frame buffer 703 is drawn by the navigation processing unit 111. An arrow 731 indicating the current location of the car 1, a mark 732 indicating the direction, an estimated arrival time and distance to destination and pass-through point 733, and so on are drawn in the frame buffer 703, with a background 734 drawn in a transparent color. The frame buffer 704 shows an example of a map including the current location that is calculated by the navigation processing unit 111 and a recommended route that is searched for. A heavy line 741 in the frame buffer 704 indicates the recommended route.

A screen 751 is an example of the screen that the front seat monitor display processing unit 115 displays on the front seat monitor 20 by superimposing the frame buffer 701, frame buffer 702, frame buffer 703, and frame buffer 704 based on the setting in the front seat monitor setting table 122 whose example is shown in FIG. 5A. Because the Setting 502 corresponding to the Frame buffer 501 "Frame buffer B" and "Frame buffer E" in the front seat monitor setting table 122 whose example is shown in FIG. 5A contains "OFF" as described above, the front seat monitor display processing unit 115 displays the screen, for example, the screen 751, on the front seat monitor 20 with the frame buffer 702 (and frame buffer E not shown) placed in the non-display mode.

A screen 752 is an example of the screen that the rear seat monitor display processing unit 116 displays on the rear seat monitor 40 by superimposing the frame buffer 701, frame buffer 702, frame buffer 703, and frame buffer 704 based on the setting in the rear seat monitor setting table 123 whose example is shown in FIG. 6A. Because the Setting 602 corresponding to the Frame buffer 601 "Frame buffer A", "Frame buffer C", "Frame buffer D", and "Frame buffer E" in the rear seat monitor setting table 123 whose example is shown in FIG. 6A contains "OFF" as described above, the rear seat monitor display processing unit 116 displays the screen, for example, the screen 752, on the rear seat monitor 40 with the frame buffer 701, frame buffer 703, and frame buffer 704 (and frame buffer E not shown) placed in the non-display mode.

Figure 8:
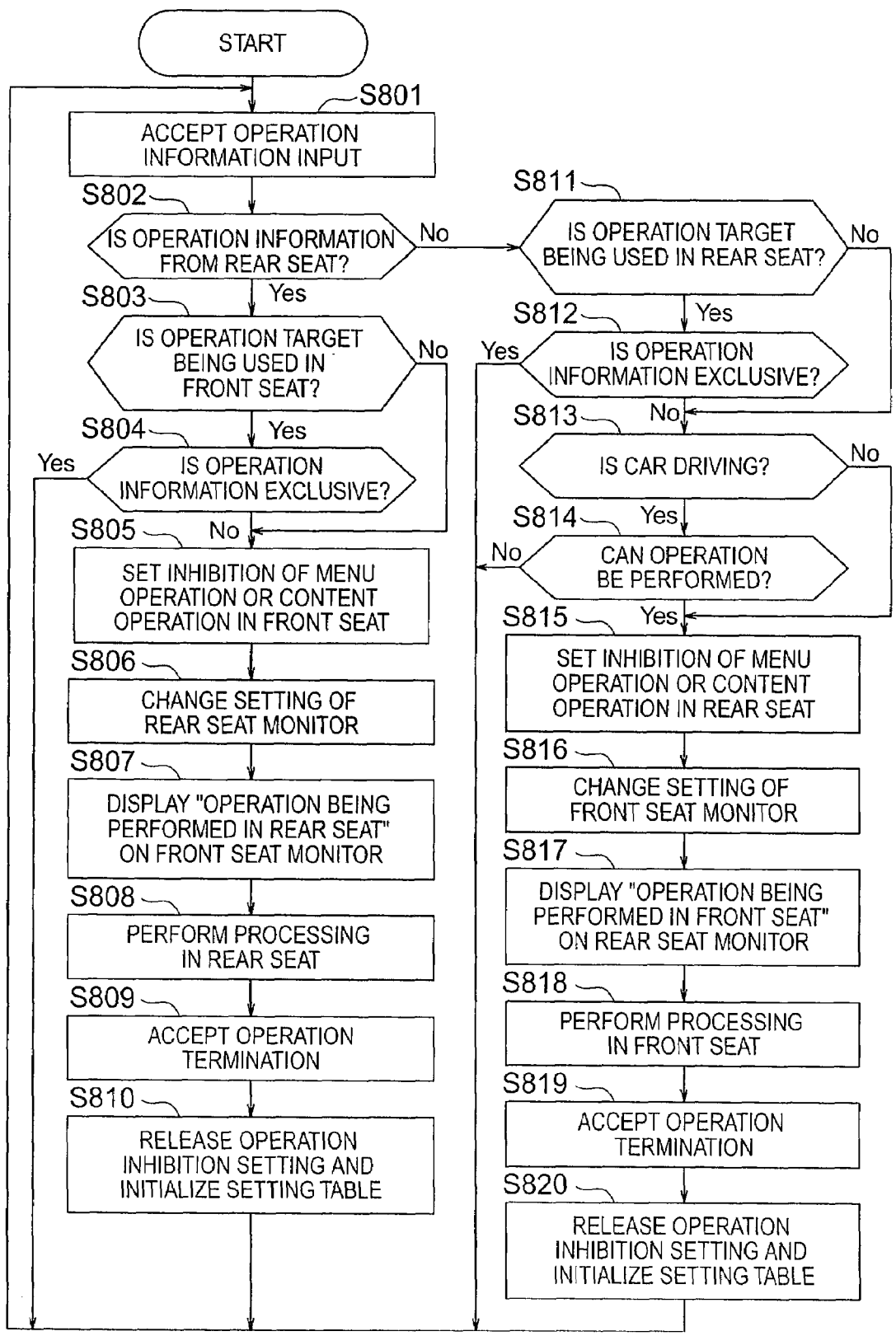
FIG. 8 is a diagram showing an example of the operation in the embodiment.

Next, the following describes an example of the operation with reference to FIG. 8.

In the initial state immediately after the power is turned on, the navigation processing unit 111 calculates the current location of the car 1 using the conventionally-available current location calculation function, reads map data including the current location from the memory 102, and draws the map image, which has been read, in the frame buffer D 144. In addition, the navigation processing unit 111 draws the icons, such as the arrow indicating the calculated current location, in the frame buffer C 143 in such a way that they overlap with the map drawn in the frame buffer D 144. Assume that the menu processing unit 112 and the content processing unit 113 have drawn the predetermined initial screens in the frame buffer A 141 and the frame buffer B 142. Also assume that no image is drawn in the frame buffer E 145.

As described above, the settings corresponding to the frame buffer A, frame buffer B, and frame buffer E in the front seat monitor setting table 122 and rear seat monitor setting table 123 contain the initial value "OFF". Therefore, the front seat monitor display processing unit 115 and the rear seat monitor display processing unit 116 each output the screen, generated by superimposing the images in the frame buffers in the graphic memory 104, to the front seat monitor 20 and the rear seat monitor 40, respectively, with the images drawn in the frame buffer A, frame buffer B, and frame buffer E placed in the non-display mode.

Figure 9A:
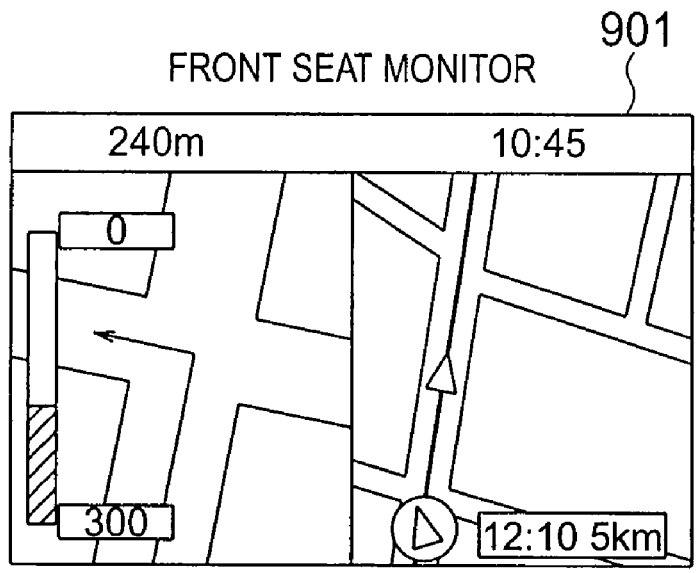
FIGS. 9A and 9B are diagrams showing an example of screens displayed on the monitors in the embodiment.
Figure 9B:
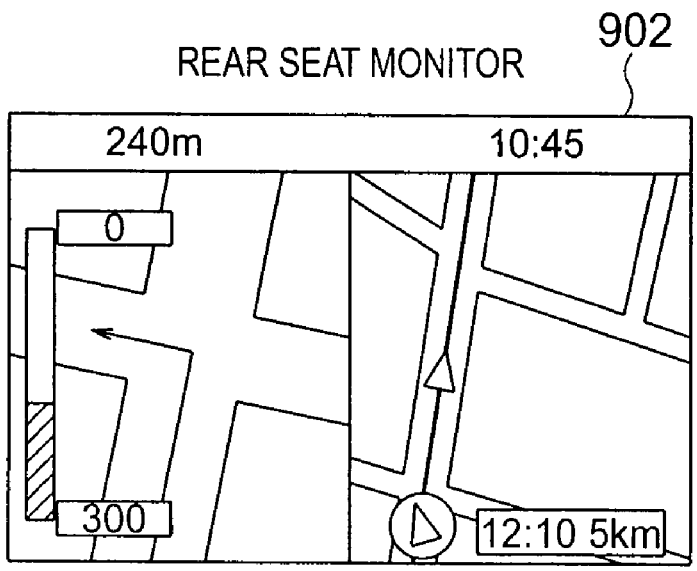

FIGS. 9A and 9B show examples of the screens on the front seat monitor 20 and the rear seat monitor 40 in the initial state. In FIG. 9A, a screen 901 is an example of the screen displayed on the front seat monitor 20. In FIG. 9B, a screen 902 is an example of the screen displayed on the rear seat monitor 40. Because the setting of the frame buffer A, frame buffer B, and frame buffer E is "OFF" as described above, the images drawn in the frame buffer C and frame buffer D are displayed on the screen 901 and the screen 902.

Referring to FIG. 8, a driver, a fellow passenger in the front passenger seat, and a fellow passenger in the rear seat use the front seat input device 30 and the rear seat input device 50, respectively, for the operation. The front seat input device processing unit 117 and the rear seat input device processing unit 118 accept the operation information (S801), entered respectively from the front seat input device 30 and the rear seat input device 50, and pass the accepted operation information to the management unit 114. For example, this operation information is information, entered by the driver and a fellow passenger, to indicate an operation instructed by pressing any of the buttons 201-207 on the front seat input device 30 and rear seat input device 50 whose example is shown in FIG. 2.

The management unit 114 checks if the passed operation information is the information entered via the rear seat input device 50 (S802). To do so, the management unit 114 checks whether the passed operation information is sent from the front seat input device processing unit 117 or from the rear seat input device processing unit 118.

If it is found as a result of the checking in S802 that the passed information is from the rear seat input device 50, the management unit 114 checks if the operation target indicated by the operation information is being operated on in the front seat (S803). To do so, the management unit 114 references the frame buffer management table 121 to check if the Operation seat 405, corresponding to the Frame buffer 401 in which an image is drawn by the execution function of the operation indicated by the operation information accepted in S801, contains information indicating that the operation is being performed in the front seat. In this case, if the corresponding Operation seat 405 in the frame buffer management table 121 contains "Front seat", the management unit 114 determines that the operation target indicated by the operation information is being operated on in the front seat. More specifically, if the operation information is entered by pressing the button 201, 202, or 207 on the rear seat input device 50 whose example is shown in FIG. 2, the management unit 114 checks if the Operation seat 405 corresponding to the Frame buffer 401 "Frame buffer D" in the frame buffer management table 121 contains "Front seat". For example, if the operation information is entered by pressing the button 204 on the rear seat input device 50 whose example is shown in FIG. 2, the management unit 114 checks if the Operation seat 405 corresponding to Frame buffer 401 "Frame buffer A" in the frame buffer management table 121 contains "Front seat". For example, if the operation information is entered by pressing the button 205 on the rear seat input device 50 whose example is shown in FIG. 2, the management unit 114 checks if the Operation seat 405 corresponding to the Frame buffer 401 "Frame buffer B" in the frame buffer management table 121 contains "Front seat".

If it is found as a result of the checking in S803 that the operation target indicated by the accepted operation information is not being operated on in the front seat, the management unit 114 passes control to the processing in S805 that will be described later.

If it is found as a result of the checking in S803 that the operation target indicated by the accepted operation information is being operated on in the front seat, the management unit 114 checks if the operation target indicated by the operation information is exclusive (S804). To do so, the management unit 114 checks the frame buffer management table 121 if the Exclusive control flag 404, corresponding to the Frame buffer 401 in which an image is drawn by the function that executes the operation indicated by the operation information accepted in S801, indicates exclusive control. In this case, if the corresponding Exclusive control flag 404 in the frame buffer management table 121 contains "O", the management unit 114 determines that the operation target indicated by the operation information is exclusive. More specifically, if the operation information is entered by pressing the button 201, 202, or 207 on the rear seat input device 50 whose example is shown in FIG. 2, the management unit 114 checks the frame buffer management table 121 if the Exclusive control flag 404 corresponding to the Frame buffer 401 "D" is "O". If the operation information is entered by pressing the button 205 on the rear seat input device 50 whose example is shown in FIG. 2, the management unit 114 checks the frame buffer management table 121 if the Exclusive control flag 404 corresponding to the Frame buffer 401 "A" is "O". If the operation information is entered by pressing the button 206 on the rear seat input device 50 whose example is shown in FIG. 2, the management unit 114 checks the frame buffer management table 121 if the Exclusive control flag 404 corresponding to the Frame buffer 401 "B" is "O".

If it is found as a result of the checking in S804 that the operation target indicated by the operation information is exclusive, the management unit 114 terminates the processing and returns control to S801. The management unit 114 may perform the operation, similar to the operation which will be described later, to draw the information indicating, in any of the frame buffers in the graphic memory 104, that the specified operation is being executed in the front seat. In this case, the rear seat monitor display processing unit 116 superimposes the frame buffers in the graphic memory 104 as described above and displays the information, indicating that the specified operation is being executed in the front seat, on the rear seat monitor 40.

If it is found as a result of the checking in S803 that the operation target indicated by the accepted operation information is not being operated on in the front seat or if it is found as a result of the checking in S804 that the operation target indicated by the operation information is not exclusive, the management unit 114 inhibits the menu operation and the content operation from being performed on the front seat input device 30 (S805). To do so, the management unit 114 stores information, indicating that the operation is being performed in the rear seat, in the Operation seat 405 included in the frame buffer management table 121 and corresponding to frame buffer A or frame buffer B in which an image is drawn by the function that executes the operation indicated by the operation information accepted in S801. In this example, the management unit 114 stores "Rear seat" in the corresponding Operation seat 405 in the frame buffer management table 121. This processing prevents an operation, which draws an image in the same frame buffer, from being executed. More specifically, if the operation information is entered by pressing the button 205 on the rear seat input device 50 whose example is shown in FIG. 2, the management unit 114 sets "Rear seat" in the Operation seat 405 corresponding to the Frame buffer 401 "Frame buffer A" in the-frame buffer management table 121. For example, if the operation information is entered by pressing the button 205 on the rear seat input device 50 whose example is shown in FIG. 2, the management unit 114 sets the Operation seat 405, corresponding to the Frame buffer 401 "Frame buffer B" in the frame buffer management table 121, to "Rear seat".

Note that, if operation information for executing an operation to draw an image in the frame buffer C or frame buffer D is accepted in S801, the management unit 114 does not set the menu operation inhibition setting or the content operation inhibition setting described above. More specifically, if operation information is entered by pressing the button 201, 202, or 207 on the rear seat input device 50 whose example is shown in FIG. 2, the management unit 114 does not perform the processing described above for the frame buffer management table 121.

The management unit 114 changes the Setting 602 corresponding to the frame buffer, in which an image is drawn by the function that executes the operation indicated by the operation information accepted in S801, in the rear seat monitor setting table 123 (S806). More specifically, if the operation information is entered by pressing the button 205 on the rear seat input device 50 whose example is shown in FIG. 2, the management unit 114 sets the Setting 602, corresponding to the Frame buffer 601 "Frame buffer A" in the rear seat monitor setting table 123, to "ON". For example, if the operation information is entered by pressing the button 205 on the rear seat input device 50 whose example is shown in FIG. 2, the management unit 114 sets the Setting 602, corresponding to Frame buffer 601 "Frame buffer B" in the rear seat monitor setting table 123, to "ON", and the Setting 602 corresponding to other frame buffers to "OFF". Note that, if the operation information is entered by pressing the button 201, 202, or 207 on the rear seat input device 50 whose example is shown in FIG. 2, the management unit 114 performs no operation. As described above, the rear seat monitor display processing unit 116 displays a screen, generated by superimposing the frame buffers in the graphic memory 104 according to the setting in the rear seat monitor setting table 123, on the rear seat monitor 40. In this way, when the rear seat monitor setting table 123 is changed, the rear seat monitor display processing unit 116 displays the screen, generated by superimposing the frame buffers in the graphic memory 104 according to the setting in the rear seat monitor setting table 123, on the rear seat monitor 40 in the same way as described above.

The management unit 114 causes the front seat monitor 20 to display information indicating that the operation is being performed in the rear seat (S807). To do so, the management unit 114 draws an image, indicating that the operation is being performed in the rear seat, in one of the frame buffers in the graphic memory 104. A frame buffer, in which an image indicating that the operation is being performed in the rear seat is drawn, may be acquired for this display, or an area for this purpose may be reserved in advance in the graphic memory 104. In this case, the front seat monitor display processing unit 115 superimposes the frame buffers in the graphic memory 104 and the frame buffer, in which an image indicating that the operation is being performed in the rear seat is drawn, in the same way as described above to display the information, indicating that the operation is being performed in the rear seat, on the front seat monitor 20.

Next, the management unit 114 instructs the processing unit, which performs the operation indicated by the operation information accepted in S801, to perform the operation. Upon receiving the instruction, the processing unit performs the operation indicated by the operation information accepted in S801 (S808). At this time, in response to the instruction, the processing unit, which is requested by the operation indicated by the operation information to display a frame buffer different from the frame buffer that has been displayed, changes the Setting 602 in the rear seat monitor setting table 123 according to the frame buffer that will be newly displayed. To check if the Setting 602 in the rear seat monitor setting table 123 is to be changed, it is possible to do the following. For example, a table is prepared in advance in the memory 102 to store the correspondence between the operation information and the frame buffers in which an image is drawn when the operation processing indicated by the operation information is performed. In this case, the processing unit that received the instruction from the management unit 114 reads a frame buffer, corresponding to the specified operation information, from the table, sets the Setting 602, corresponding to the frame buffer in the rear seat monitor setting table 123 that has been read, to "ON", and sets the other Setting 602 to "OFF". It is also possible to include the processing in the program, which performs the operation indicated by the entered operation information, to set the Setting 602, included in the rear seat monitor setting table 123 and corresponding to the frame buffer in which an image is drawn by the operation processing, to "ON" and to set the other Setting 602 to "OFF".

More specifically, when the operation information is entered by pressing the button 201, 202, or 207 on the rear seat input device 50 whose example is shown in FIG. 2, the management unit 114 instructs the navigation processing unit 111 to perform the processing. When the operation information is entered by pressing the button 201, the navigation processing unit 111 controls the display so that the map drawn in the frame buffer D 144 is scaled down. When the operation information is entered by pressing the button 202, the navigation processing unit 111 controls the display so that the map drawn in the frame buffer D 144 is scaled up. When the operation information is entered by pressing the button 207, the navigation processing unit 111 controls the display so that the map drawn in the frame buffer D 144 is scrolled according to the pressed button 207.

For example, when the operation information is entered by pressing the button 205 on the rear seat input device 50 whose example is shown in FIG. 2, the management unit 114 instructs the menu processing unit 112 to perform the processing. Next, as instructed by the operation information entered from the rear seat input device 50, the menu processing unit 112 expands the menu and draws the menu in the frame buffer A 141. When a menu button displayed on the rear seat monitor 40 is pressed to specify the processing such as the route search, destination setting, landmark search, or address/phone number search, the management unit 114 instructs the navigation processing unit 111 to perform the processing. The navigation processing unit 111 performs the processing such as the route search, destination setting, landmark search, or address/phone number search according to the instruction. This processing is the same as that in the conventionally available navigation system. In this case, when a frame buffer not displayed at that time is displayed or when a frame buffer displayed at that time is erased in the same manner as in the conventionally available navigation system, the navigation processing unit 111 changes the Setting 602 corresponding to the Frame buffer 601, in which an image is drawn based on the operation information, in the rear seat monitor setting table 123. For example, when a route that is search for, a map for setting the destination, the location of and information on a landmark that is searched for, or a location that is searched for based on an address/phone number is displayed, the navigation processing unit 111 sets the Setting 602, corresponding to the Frame buffer 601 "Frame buffer D" in the rear seat monitor setting table 123, to "OFF", and sets the Setting 602, corresponding to Frame buffer 601 "Frame buffer E", to "ON".

For example, when the operation information is entered by pressing the button 206 on the rear seat input device 50 whose example is shown in FIG. 2, the management unit 114 instructs the content processing unit 113 to perform the processing. Next, as instructed by the operation information entered from the rear seat input device 50, the content processing unit 113 draws the image of a content already stored in the memory 102, or the image of a content sent from the server 3, in the frame buffer B 142. If the operation information entered from the rear seat input device 50 indicates the acquisition of a content from the server 3, the content processing unit 113 sends content request information to the server 3. In response to this request, the server 3 reads the content, stored in the storage device, and sends the content. The content processing unit 113 stores the content, received via the communication device 70, in the memory 102 and draws the image of the content in the frame buffer B 142. The content is, for example, a program, a moving image, or a still image sent from the server 3 as described above. Therefore, when the content is a program, the content processing unit 113 executes the program and draws an image, generated by the execution, in the frame buffer B 142. When the content is a moving image or a still image, the content processing unit 113 uses the browser function to draw the image of the moving image or the still image in the frame buffer B 142. When the operation information entered from the rear seat input device 50 specifies the execution and display of a content in the memory 102, the content processing unit 113 draws the image of the content, read from the memory 102, in the frame buffer B 142 in the same manner as described above.

The rear seat monitor display processing unit 116 displays the screen, generated by superimposing the frame buffers in the graphic memory 104, on the rear seat monitor 40 according to the setting in the rear seat monitor setting table 123 in the same way as described above.

The following describes an example of the screen of the front seat monitor 20 and the rear seat monitor 40 displayed when the processing in S808 is executed with reference to FIG. 10A to FIG. 10F.

Figure 10A:
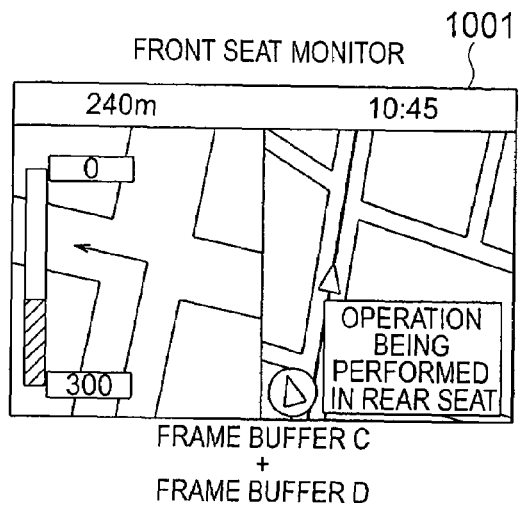
FIGS. 10A to 10F are diagrams showing an example of screens displayed on the monitors in the embodiment.
Figure 10B:
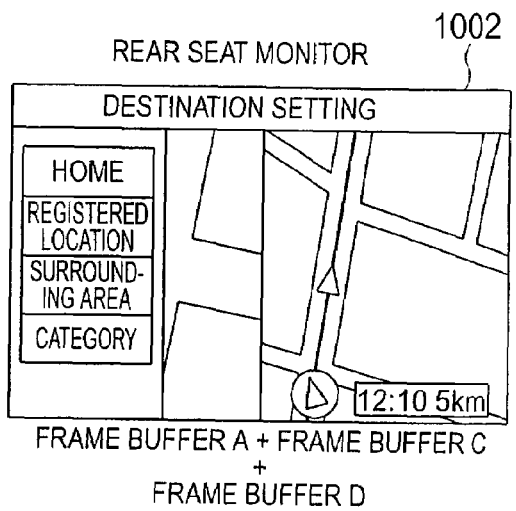

A screen 1001 and a screen 1002, shown respectively in FIGS. 10A and 10B, are examples of the screens displayed on the front seat monitor 20 and the rear seat monitor 40 at the same time. The screen 1001 is an example of the screen displayed on the front seat monitor 20. The screen 1002 is an example of the screen displayed on the rear seat monitor 40. The screen 1002 is an example of the screen displayed when a fellow passenger in the rear seat presses the button 205 on the rear seat input device 50 whose example is shown in FIG. 2 to specify the display of the menu screen for setting a destination. In this case, the operation information specifying the display of the menu screen for setting a destination is entered from the rear seat input device 50 into the navigation device 10 in S801. The management unit 114 performs the processing described above according to the entered operation information to update the frame buffer management table 121 and the rear seat monitor setting table 123. More specifically, the management unit 114 stores "Rear seat" in the Operation seat 405 corresponding to the Frame buffer 401 "Frame buffer A" in the frame buffer management table 121. In addition, the management unit 114 sets the Setting 602, corresponding to Frame buffer 601 "Frame buffer A" in the rear seat monitor setting table 123, to "ON". The menu processing unit 112 draws the menu screen in the frame buffer A 141 according to the operation information entered from the rear seat input device 50. The rear seat monitor display processing unit 116 displays the screen 1002, generated by superimposing the frame buffers, on the rear seat monitor 40 according to the setting in the rear seat monitor setting table 123. Because the Setting 602 corresponding to the Frame buffer 601 "Frame buffer B" and "Frame buffer E" is "OFF" in the rear seat monitor setting table 123 as a result of the processing described above, the rear seat monitor display processing unit 116 displays the image, drawn in the frame buffer A, frame buffer C, and frame buffer D, on the screen 1002. In addition, because the front seat monitor setting table 122 is not updated, the front seat monitor display processing unit 115 displays the image, drawn in the frame buffer C and frame buffer D, on the screen 1001.

Figure 10C:
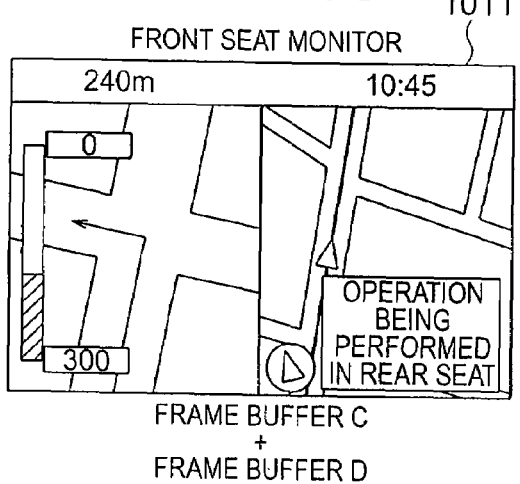
Figure 10D:
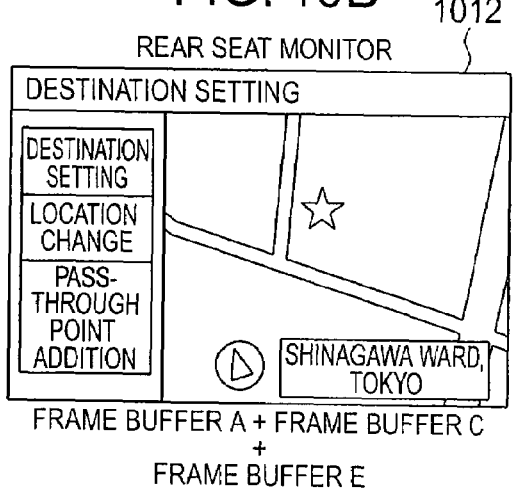

A screen 1011 and a screen 1012, shown respectively in FIGS. 10C and 10D, are examples of the screens displayed on the front seat monitor 20 and the rear seat monitor 40 at the same time. The screen 1011 is an example of the screen displayed on the front seat monitor 20. The screen 1012 is an example of the screen displayed on the rear seat monitor 40. The screen 1012 is an example of the screen displayed when a fellow passenger in the rear seat selects a menu from the menu screen whose example is shown on the screen 1002 or when a fellow passenger presses the button 207 on the rear seat input device 50 whose example is shown in FIG. 2 to specify a destination. The navigation processing unit 111 sets the Setting 602, corresponding to the Frame buffer 601 "Frame buffer D" in the rear seat monitor setting table 123, to "OFF" and, in addition, sets the Setting 602, corresponding to the Frame buffer 601 "Frame buffer E", to "ON". The navigation processing unit 111 also reads the map including the location selected on the menu screen or the map including the location selected by pressing the button 207 from the storage device 105, and draws the map, which has been read, in the frame buffer E 145. The menu processing unit 112 draws the menu screen in the frame buffer A 141 according to the operation information. The rear seat monitor display processing unit 116 displays the screen 1012, in which the frame buffers are superimposed, on the rear seat monitor 40 in the same manner as described above. Because the Setting 602 corresponding to the Frame buffer 601 "Frame buffer B" and "Frame buffer D" is "OFF" in the rear seat monitor setting table 123 as a result of the processing described above, the rear seat monitor display processing unit 116 displays the image, drawn in the frame buffer A, frame buffer C, and frame buffer E, on the screen 1012. In addition, because the front seat monitor setting table 122 is not updated, the front seat monitor display processing unit 115 displays the image, drawn in the frame buffer C and frame buffer D, on the screen 1011.

Figure 10E:
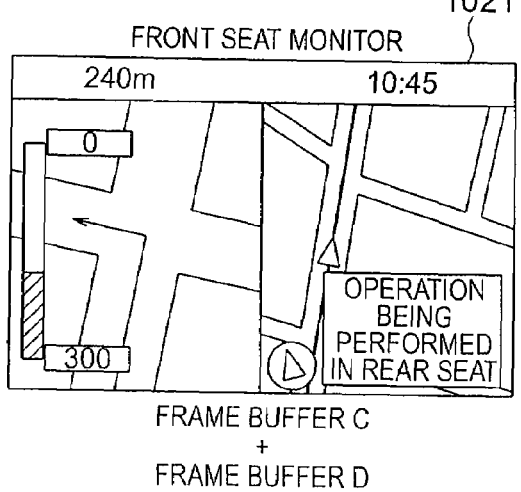
Figure 10F:
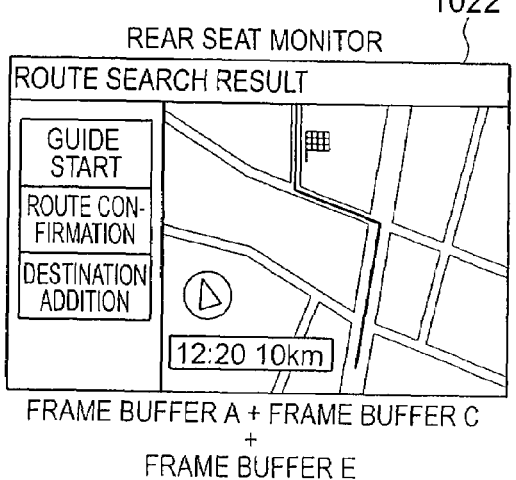

A screen 1021 and a screen 1022, shown respectively in FIGS. 10E and 10F, are examples of the screens displayed on the front seat monitor 20 and the rear seat monitor 40 at the same time. The screen 1021 is an example of the screen displayed on the front seat monitor 20. The screen 1022 is an example of the screen displayed on the rear seat monitor 40. The screen 1022 is an example of the screen displayed when a fellow passenger in the rear seat specifies a search for a route to the destination on the menu screen whose example is shown on the screen 1012 and, in response to the specification, the navigation processing unit 111 has searched for the recommended route to the specified destination. The navigation processing unit 111 searches for the recommended route from the current location to the destination using the conventionally available route search method, reads the map including the recommended route that has been searched for from the storage device 105, and draws the map, which has been read, in the frame buffer E 145. The menu processing unit 112 draws the menu screen in the frame buffer A 141 according to the operation information. The rear seat monitor display processing unit 116 displays the screen 1022, generated by superimposing the frame buffers, on the rear seat monitor 40 in the same manner as described above. Because the Setting 602 corresponding to the Frame buffer 601 "Frame buffer B" and "Frame buffer D" is "OFF" in the rear seat monitor setting table 123 as a result of the processing described above, the rear seat monitor display processing unit 116 displays the image, drawn in the frame buffer A, frame buffer C, and frame buffer E, on the screen 1022. In addition, because the front seat monitor setting table 122 is not updated, the front seat monitor display processing unit 115 displays the image, drawn in the frame buffer C and frame buffer D, on the screen 1021.

Returning to FIG. 8, when the operation is terminated, the fellow passenger presses the button 203 or the button 204 on the rear seat input device 50 whose example is shown in FIG. 2 to indicate that the operation is terminated. In response to the operation information from the rear seat input device 50 indicating that the operation is terminated (S809), the management unit 114 releases the inhibition setting of the menu operation and the content operation performed by the front seat input device 30 and initializes the rear seat monitor setting table 123 (S810). For example, the operation by the fellow passenger is terminated when the program executing the specified operation is terminated. More specifically, for example, when the operation information specifying the acquisition, execution, reproduction, or display of a content is entered, the operation by the fellow passenger is terminated when the content processing unit 113 terminates the acquisition, execution, reproduction, or display of a content or when the fellow passenger enters a processing termination instruction by pressing the button 204 on the rear seat input device 50 whose example is shown in FIG. 2. For example, when the route search processing or the destination setting processing is specified, the operation by the fellow passenger is terminated when the navigation processing unit 111 searches for a recommended route and the fellow passenger accepts the guidance via the recommended route or when the fellow passenger enters a processing termination instruction by pressing the button 204 on the rear seat input device 50 whose example is shown in FIG. 2. For example, when the operation information indicating the landmark search processing or the address/telephone number search processing is entered, the operation by the fellow passenger is terminated when the navigation processing unit 111 searches for the location and the detailed information based on the specified address, phone number, or name and displays the search result and, after that, the fellow passenger specifies the termination of the address/phone number search processing or landmark search processing by pressing the button 203 on the rear seat input device 50 whose example is shown in FIG. 2 or when the fellow passenger specifies the termination of the processing by pressing the button 204 on the rear seat input device 50 whose example is shown in FIG. 2. For example, when the operation information indicating the scale change of a map is entered, the operation by the fellow passenger is terminated when the navigation processing unit 111 displays the map at a specified scale and the fellow passenger selects a display scale ratio by pressing the button 203 on the rear seat input device 50 whose example is shown in FIG. 2 or when the fellow passenger cancels the display scale change by pressing the button 204 on the rear seat input device 50 whose example is shown in FIG. 2. For example, when the operation information indicating the scroll operation of a map is entered, the operation by the fellow passenger is terminated when the navigation processing unit 111 scrolls the map according to the instruction and, after that, the fellow passenger cancels the scroll of the map by pressing the button 204 on the rear seat input device 50 whose example is shown in FIG. 2.

To release the inhibition setting of the menu operation or the content operation by the front seat input device 30, the management unit 114 stores the information, indicating that no operation is being performed, in the Operation seat 405 in the frame buffer management table 121 that was changed in S805. In this case, the management unit 114 stores "-" in the corresponding Operation seat 405 in the frame buffer management table 121. In addition, the management unit 114 initializes the rear seat monitor setting table 123 and stops the display of the information on the front seat monitor 20 indicating that the operation is being performed in the rear seat. More specifically, the management unit 114 sets the Setting 602, corresponding to Frame buffer 601 "Frame buffer A", "Frame buffer B", and "Frame buffer E" in the rear seat monitor setting table 123, to "OFF".

After the inhibition setting of the menu operation or the content operation by the front seat input device 30 is released and the rear seat monitor setting table 123 is initialized, the same screen is displayed on the front seat monitor 20 and the rear seat monitor 40.

Figure 11A:
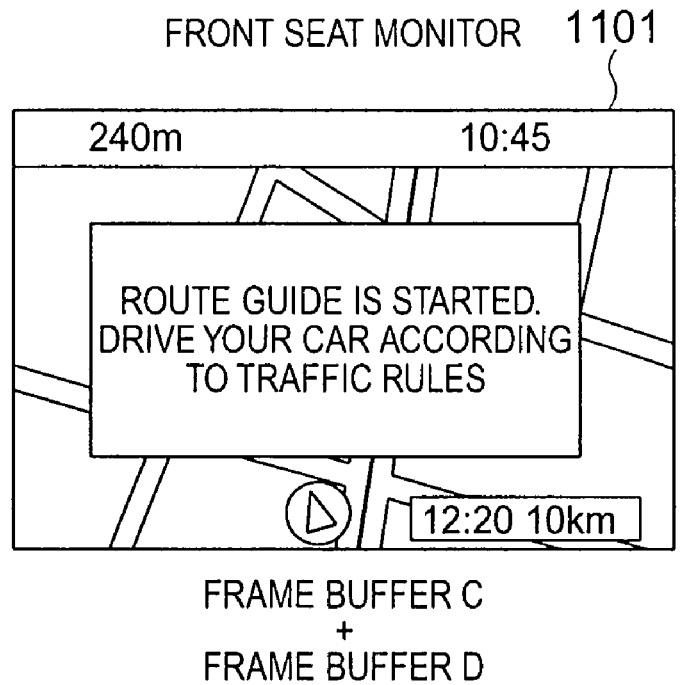
FIGS. 11A and 11B are diagrams showing an example of screens displayed on the monitors in the embodiment.
Figure 11B:
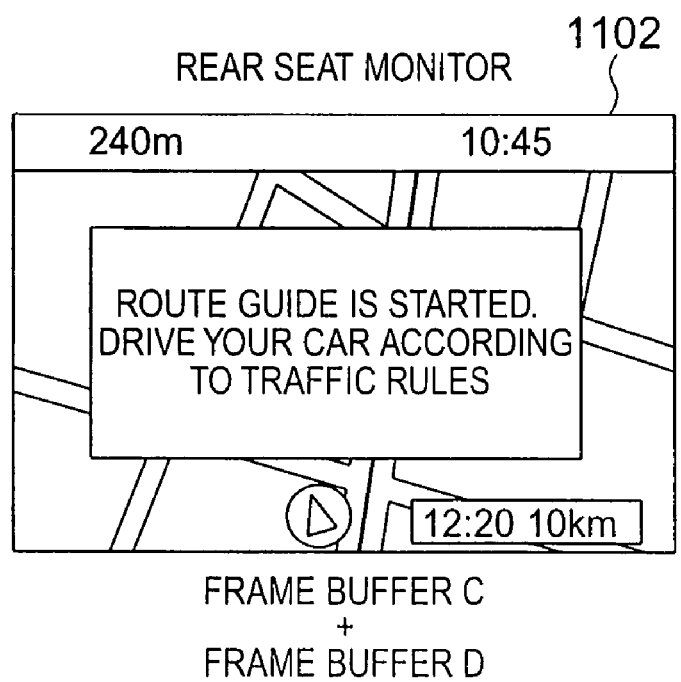

The following describes, with reference to FIG. 11A and FIG. 11B, an example of the screen of the front seat monitor 20 and the rear seat monitor 40 after the processing in S810 is performed.

A screen 1101 and a screen 1102 shown in FIGS. 11A and 11B are an example of the screens displayed at the same time on the front seat monitor 20 and the rear seat monitor 40. The screen 1101 is an example of the screen displayed on the front seat monitor 20. The screen 1102 is an example of the screen displayed on the rear seat monitor 40. The screen 1102 is an example in which the fellow passenger in the rear seat sets a recommended route in the examples of the screen in FIG. 10A to 10F and specifies the acceptance of the guidance via the recommended route. The management unit 114 performs the processing described above according to the entered operation information to release the inhibition setting of the menu operation or the content operation performed by the front seat input device 30 and to initialize the rear seat monitor setting table 123. This processing sets the Setting 602, corresponding to Frame buffer 601 "Frame buffer A", "Frame buffer B", and "Frame buffer E" in the rear seat monitor setting table 123, to "OFF", causing the rear seat monitor display processing unit 116 to display the image, drawn in the frame buffer C and the frame buffer D, on the screen 1102. Because the front seat monitor setting table 122 is not updated, the front seat monitor display processing unit 115 displays the image, drawn in the frame buffer C and the frame buffer D, on the screen 1101.

Returning to FIG. 8, if it is found as a result of the checking in S802 that the passed operation information is not from the rear seat input device 50, the management unit 114 checks if the operation target indicated by the operation information is being operated on in the rear seat (S811). To do so, the management unit 114 references the frame buffer management table 121 to check if the Operation seat 405, corresponding to the Frame buffer 401 in which an image is drawn by the execution function of the operation indicated by the operation information accepted in S801, contains information indicating that the operation is being performed in the rear seat. In this case, if the corresponding Operation seat 405 in the frame buffer management table 121 contains "Rear seat", the management unit 114 determines that the operation target indicated by the operation information is being operated on in the rear seat. A specific example is the same as that in S804 described above and, therefore, the description is omitted here.

If it is found as a result of the checking in S811 that the operation target indicated by the accepted operation information is not being operated on in the rear seat, the management unit 114 performs the processing in S813 that will be described later.

If it is found as a result of the checking in S811 that the operation target indicated by the accepted operation information is being operated on in the rear seat, the management unit 114 checks if the operation target indicated by the operation information is exclusive (S812). To do so, the management unit 114 checks the frame buffer management table 121 if the Exclusive control flag 404, corresponding to the Frame buffer 401 in which an image is drawn by the function that executes the operation indicated by the operation information accepted in S801, indicates exclusive control. In this case, if the corresponding Exclusive control flag 404 in the frame buffer management table 121 contains "O", the management unit 114 determines that the operation target indicated by the operation information is exclusive. A specific example is the same as that in S803 described above and, therefore, the description is omitted here.

If it is found as a result of the checking in S812 that the operation target indicated by the operation information is exclusive, the management unit 114 terminates the processing and returns control back to S801. The management unit 114 may perform the operation, similar to the operation described above, to draw the information, in any of the frame buffers in the graphic memory 104, indicating that the specified operation is being executed in the rear seat. In this case, the front seat monitor display processing unit 115 superimposes the frame buffers in the graphic memory 104 as described above and displays the information, indicating that the specified operation is being executed in the rear seat, on the front seat monitor 20.

If it is found as a result of the checking in S811 that the operation target indicated by the accepted operation information is not being operated on in the rear seat or if it is found as a result of the checking in S812 that the operation target indicated by the operation information is not exclusive, the management unit 114 checks if the car 1 is driving (S813). To do so, to determine if the car 1 is driving, the management unit 114 checks the car speed of the car 1 received from the sensor interface 103 or compares the calculated current location and the previous location received from the GPS reception device 60 with the current location.

If it is found as a result of the checking in S813 that the car is not driving, the management unit 114 performs the processing in S815 that will be described later.

If it is found as a result of the checking in S813 that the car is driving, the management unit 114 checks if the operation information accepted in S801 indicates an operation that can be performed even during the driving (S814). The operation that can be performed even during the driving is, for example, the scrolling of a map or the scale change. To do so, the management unit 114 references a predetermined table (not shown), which includes the operations that can be performed even during the driving, to determine if the operation indicated by the operation information accepted in S801 is included in this table.

If it is found as a result of the checking in S814 that the accepted operation information does not indicate an operation that can be performed even during the driving, the management unit 114 terminates the processing and passes control back to the processing in S801. In this case, the management unit 114 may perform the operation similar to the one described above to draw the information, in one of the frame buffers in the graphic memory 104, indicating that the specified operation cannot be performed during the driving. In this case, the front seat monitor display processing unit 115 superimposes the frame buffers in the graphic memory 104 to display the information, which indicates that the specified operation cannot be performed during the driving, on the front seat monitor 20 in the same manner as described above.

If it is found as a result of the checking in S813 that the car is not driving or if it is found as a result of the checking in S814 that the accepted operation information indicates an operation that can be performed even during the driving, the management unit 114 inhibits the menu operation and the content operation by the rear seat input device 50 (S185). To do so, the management unit 114 stores the information, which indicates that the operation is being performed in the rear seat, in the Operation seat 405 included in the frame buffer management table 121 and corresponding to the frame buffer A or the frame buffer B in which an image is drawn by the function that executes the operation indicated by the operation information accepted in S801. In this case, the management unit 114 stores "Front seat" in the corresponding Operation seat 405 in the frame buffer management table 121. This processing prevents another operation from drawing an image in the same frame buffer. More specifically, when the operation information is entered by pressing the button 205 on the front seat input device 30 whose example is shown in FIG. 2, the management unit 114 sets the Operation seat 405, corresponding to the Frame buffer 401 "Frame buffer A" in the frame buffer management table 121, to "Front seat". For example, when the operation information is entered by pressing the button 205 on the front seat input device 30 whose example is shown in FIG. 2, the management unit 114 sets the Operation seat 405, corresponding to the Frame buffer 401 "Frame buffer B" in the frame buffer management table 121, to "Front seat".

If the operation information requesting that an image be drawn in the frame buffer C or the frame buffer D is accepted in S801, the menu operation and the content operation, which are inhibited in the above description, are not inhibited. More specifically, if operation information is entered by pressing the button 201, 202, or 207 on the rear seat input device 50 whose example is shown in FIG. 2, the management unit 114 does not perform the operation described above for the frame buffer management table 121.

The management unit 114 changes the Setting 602 corresponding to the frame buffer, in which an image is drawn by the function that executes the operation indicated by the operation information accepted in S801, in the front seat monitor setting table 122 (S816). An example of the specific operation is the same as that of the operation in S806 and, therefore, the description is omitted.

The management unit 114 causes the rear seat monitor 40 to display the information indicating that the operation is being performed in the front seat (S817). To do so, the management unit 114 draws text data or am image, which indicates that the operation is being performed in the front seat, in one of the frame buffers in the graphic memory 104. An example of the specific operation is the same as that of the operation in S807 and, therefore, the description is omitted.

Next, the management unit 114 instructs a processing unit, which performs the operation indicated by the operation information accepted in S801, to perform the operation. In response to the instruction, the operation unit performs the operation indicated by the operation information accepted in S801 (S818). At this time, if the operation indicated by the operation information is performed and a frame buffer different from the frame buffer that has been displayed is displayed, the processing unit that receives the instruction changes the Setting 602 in the front seat monitor setting table 122 according to the newly displayed frame buffer. An example of the specific operation is the same as that of the operation in S808 and, therefore, the description is omitted.

When the operation is terminated, the driver presses the button 203 or the button 204 on the front seat input device 30 whose example is shown in FIG. 2 to terminate the operation. When the operation information indicating the termination of the operation is entered from the front seat input device 30 (S819), the management unit 114 releases the inhibition setting of the menu operation and the content operation by the rear seat input device 50 and initializes the front seat monitor setting table 122 (S820). The same operation is performed as when a fellow passenger terminates the operation and, therefore, the description is omitted here. To release the inhibition setting of the menu operation and the content operation by the rear seat input device 50, the management unit 114 stores information, which indicates that no operation is being performed, in the Operation seat 405 in the frame buffer management table 121 that was changed in S815. In this case, the management unit 114 stores "-" in the corresponding Operation seat 405 in the frame buffer management table 121. In addition, the management unit 114 initializes the front seat monitor setting table 122 and stops the display of the information on the rear seat monitor 40 indicating that the operation is being performed in the rear seat. More specifically, the management unit 114 sets the Setting 502, corresponding to Frame buffer 501 "Frame buffer A", "Frame buffer B", and "Frame buffer E" in the front seat monitor setting table 122, to "OFF".

As described above, the front seat monitor setting table 122 and the rear seat monitor setting table 123, which indicate which of the multiple frame buffers are displayed, are provided respectively for the front seat monitor 20 and the rear seat monitor 40. When operation information is entered from the rear seat input device 50, the front seat monitor setting table 122 can be changed so that a frame buffer, in which an image is drawn by the operation indicated by the operation information, is not displayed. This prevents the driver from being distracted even if a fellow passenger operates the navigation device 10. Conversely, when operation information is entered from the front seat input device 30, the rear seat monitor setting table 123 can be changed so that a frame buffer, in which an image is drawn by the operation indicated by the operation information, is not displayed.

It is also possible for the frame buffer management table 121 to store information indicating an input device from which operation information is entered to perform processing for drawing an image in each of the multiple frame buffers. In this case, if operation information is entered from the front seat input device 30 but if the frame buffer management table 121 stores information indicating that the frame buffer, in which an image is to be drawn by the processing performed by the entered operation information, already contains an image generated by operation information from the rear seat input device 50; it is possible to prevent the processing of the operation information, entered from the front seat input device 30, from being performed. This makes the operations, which perform processing for drawing an image in the same frame buffer, mutually exclusive.

While the embodiment of the present invention has been described in detail with reference to the attached drawings, it will be understood that the practical configuration is not limited to this embodiment but the design changes may be included without departing from the spirit of this invention.

For example, although the corresponding Setting 502 in the front seat monitor setting table 122 is set to "OFF" when operation information is entered from the front seat input device 30 to prevent an image, which will be drawn by the operation information, from being drawn on the back monitor 40 in the embodiment described above, the present invention is not limited to this. When operation information is entered from the front seat input device 30, it is also possible not to set the corresponding Setting 502 in the front seat monitor setting table 122 to "OFF" but to display the image, which will be drawn by the operation information, on the back monitor 40.

In addition, although the image of a map whose scale is changed or which is scrolled by operation information entered from one of the input devices is displayed on both the front seat monitor 20 and the rear seat monitor 40 in the embodiment described above, the present invention is not limited to this. It is also possible to output the image of a map, whose scale is changed or which is scrolled by operation information entered from one of the input devices, only on one of the output devices. In this case, it is also possible to output an image, generated by operation information entered from the front seat input device 30, only on the front seat monitor 20, and to output an image, generated by operation information entered from the rear seat input device 50, only on the rear seat monitor 40. It is also possible to output an image, generated by operation information entered from the front seat input device 30 on both the front seat monitor 20 and the rear seat monitor 40, and to output an image, generated by operation information entered from the rear seat input device 50, only on the rear seat monitor 40.

The following describes a practical example of the operation in which an image generated by operation information entered from the front seat input device 30 is output only on the front seat monitor 20, and an image generated by operation information entered from the rear seat input device 50 is output only on the rear seat monitor 40. For example, when operation information is entered by pressing the button 201 on the rear seat input device 50 whose example is shown in FIG. 2, the navigation processing unit 111 sets the Setting 602, corresponding to the Frame buffer 601 "Frame buffer D" in the rear seat monitor setting table 123, to "OFF", and the Setting 602, corresponding to Frame buffer 601 "Frame buffer E", to "ON". Next, the navigation processing unit 111 copies the map data, drawn in the frame buffer D 144, to the frame buffer E 145 and, in addition, controls the display so that the map drawn in the frame buffer E 145 is scaled down. When operation information is entered by pressing the button 202, the navigation processing unit 111 sets the Setting 602, corresponding to Frame buffer 601 "Frame buffer D" in the rear seat monitor setting table 123, to "OFF", and the Setting 602, corresponding to the Frame buffer 601 "Frame buffer E", to "ON". Next, the navigation processing unit 111 copies the map data, drawn in the frame buffer D 144, to the frame buffer E 145 and, in addition, controls the display so that the map drawn in the frame buffer E 145 is scaled up. When the operation information is entered by pressing the button 207, the navigation processing unit 111 sets the Setting 602, corresponding to the Frame buffer 601 "Frame buffer D" in the rear seat monitor setting table 123, to "OFF", and the Setting 602, corresponding to the Frame buffer 601 "Frame buffer E", to "ON". Next, the navigation processing unit 111 copies the map data, drawn in the frame buffer D 144, to the frame buffer E 145 and, in addition, controls the display by scrolling the map drawn in the frame buffer E 145 in response to the button 207 that is pressed.

The following describes a practical example of the operation in which an image generated by operation information entered from the front seat input device 30 is output on both the front seat monitor 20 and the rear seat monitor 40, and an image generated by operation information entered from the rear seat input device 50 is output only on the rear seat monitor 40. For example, when operation information is entered from the front seat input device 30, the operation is performed in the same manner as in the example shown in FIG. 8 described above. When operation information is entered from the rear seat input device 50, the operation is performed in the same manner as in the practical example described above in which an image generated by operation information entered from the front seat input device 30 is output only on the front seat monitor 20 and an image generated by operation information entered from the rear seat input device 50 is output only on the rear seat monitor 40.

In the example described above, after executing the processing indicated by the operation information, the front seat monitor setting table 122 and the rear seat monitor setting table 123 are initialized in the same manner as in the example in FIG. described above.

The rear seat input device 50 may also be used to prevent an operation not desired by a driver, such as a recommended route setting, from being performed. In this case, an operation inhibition seat (front seat, rear seat) field is added to each of the Frame buffer 401 in the frame buffer management table 121. When operation information is accepted in S802 described above, the management unit 114 references the operation inhibition seat field corresponding to the frame buffer in which an image is drawn by the function for executing the operation indicated by the operation information accepted in S801. If the accepted operation information is entered from the seat indicated by the field, the management unit 114 does not perform the operation but terminates the processing.

Although the combination of an input device and a monitor is composed of the two seats, front seat and rear seat, in the embodiment described above, the present invention is not limited to this but accept a combination of any number of input devices and monitors. The combination of an input device and a monitor may be installed not only in the front seat and the rear seat but also in the front passenger seat.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A navigation system, connected to a combination of a first output device and a first input device and to a combination of a second output device and a second input device, for performing processing indicated by operation information from said input devices and for outputting information, generated by the processing, onto said output devices, said navigation system comprising:

first setting information storage means that stores setting information indicating whether or not the information generated by the processing is to be output to said first output device;

second setting information storage means that stores setting information indicating whether or not the information generated by the processing is to be output to said second output device;

first output processing means that outputs the information, generated by the processing, to said first output device according to the setting information read from said first setting information storage means;

second output processing means that outputs the information, generated by the processing, to said second output device according to the setting information read from said second setting information storage means, and setting means, wherein, when the operation information is entered from said second input device, said setting means changes the setting information, stored in said first setting information storage means, to a setting that does not output the information generated by the processing indicated by the entered operation information.

2. A navigation system, connected to a combination of a first output device and a first input device and to a combination of a second output device and a second input device, for performing processing indicated by operation information from said input devices and for outputting information, generated by the processing, onto said output devices, said navigation system comprising:

a plurality of frame buffers including a frame buffer in which an image is drawn for displaying the information generated by the processing indicated by the operation information;

first setting information storage means that stores a correspondence between each of said plurality of frame buffers and setting information indicating whether or not an image drawn in each of said plurality of frame buffers is to be output to said first output device;

second setting information storage means that stores a correspondence between each of said plurality of frame buffers and setting information indicating whether or not an image drawn in each of said plurality of frame buffers is to be output to said second output device;

first output processing means that superimposes the image drawn in each of said plurality of frame buffers according to the setting information read from said first setting information storage means and outputs the superimposed image onto said first output device;

second output processing means that superimposes the image drawn in each of said plurality of frame buffers according to the setting information read from said second setting information storage means and outputs the superimposed image onto said second output device; and setting means, wherein, when the operation information is entered from said second input device, said setting means changes the setting information to a setting that does not output the superimposed image to said first output device, said setting information being stored in said first setting information storage means, said setting information corresponding to a frame buffer in which an image is drawn for displaying information corresponding to the entered operation information.

3. The navigation system according to claim 2, wherein, when the operation information is entered from said first input device, the setting information is changed to a setting that does not output the superimposed image to said second output device, said setting information being stored in said second setting information storage means, said setting information corresponding to a frame buffer in which an image is drawn for displaying information generated by the processing indicated by the operation information.

4. The navigation system according to claim 3, further comprising:

management information storage means that stores a correspondence between each of said plurality of frame buffers and operation device information, said operation device information indicating an input device from which operation information used to generate the information drawn in each of said plurality of buffers is entered, wherein, when the operation information is entered from said first input device, said setting means sets the operation device information to information indicating said first input device, said operation device information being stored in said management information storage means, said operation device information corresponding to a frame buffer in which an image for displaying information for the entered operation information is drawn, when the operation information is entered from said second input device, said setting means sets the operation device information to information indicating said second input device, said operation device information being stored in said management information storage means, said operation device information corresponding to a frame buffer in which an image for displaying information for the entered operation information is drawn, when the operation information is entered from said first input device, said setting means reads the operation device information and, if the operation device information that has been read is information indicating said second input device, does not perform processing requested by the entered operation information, said operation device information being stored in said management information storage means, said operation device information corresponding to a frame buffer in which an image for displaying information for the entered operation information is drawn, and when the operation information is entered from said second input device, said setting means reads the operation device information and, if the operation device information that has been read is information indicating said first input device, does not perform processing requested by the entered operation information, said operation device information being stored in said management information storage means, said operation device information corresponding to a frame buffer in which an image for displaying information generated by processing indicated by the operation information is drawn.

5. An output control method for use by a navigation system, connected to a combination of a first output device and a first input device and to a combination of a second output device and a second input device, for performing processing indicated by operation information from said input devices and for outputting information, generated by the processing, onto said output devices, said navigation system comprising:

first setting information storage means that stores setting information indicating whether or not the information generated by the processing is to be output to said first output device;

second setting information storage means that stores setting information indicating whether or not the information generated by the processing is to be output to said second output device;

first output processing means that outputs the information, generated by the processing, to said first output device according to the setting information read from said first setting information storage means; and second output processing means that outputs the information, generated by the processing, to said second output device according to the setting information read from said second setting information storage means, wherein, when the operation information is entered from said second input device, said output control method comprises the step of changing the setting information, stored in said first setting information storage means, to a setting that does not output the information generated by the processing indicated by the entered operation information.

* * * * *